US012023745B2

(12) United States Patent
Nossaman et al.

(10) Patent No.: US 12,023,745 B2
(45) Date of Patent: Jul. 2, 2024

(54) CUTTER WHEEL WEAR INSERTS AND MOUNTING

(71) Applicant: Vermeer Manufacturing Company, Pella, IA (US)

(72) Inventors: Joshua Nossaman, Pella, IA (US); Claudio Verzilli, Pella, IA (US); Duane Harthoorn, Lynnville, IA (US); Daniel Roorda, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 300 days.

(21) Appl. No.: 17/719,778

(22) Filed: Apr. 13, 2022

(65) Prior Publication Data
US 2022/0355397 A1 Nov. 10, 2022

Related U.S. Application Data

(60) Provisional application No. 63/184,338, filed on May 5, 2021.

(51) Int. Cl.
*A01G 23/06* (2006.01)
*B23C 5/08* (2006.01)
*B23C 5/20* (2006.01)
*B27G 13/08* (2006.01)

(52) U.S. Cl.
CPC ............. *B23C 5/202* (2013.01); *B23C 5/08* (2013.01); *B27G 13/08* (2013.01); *B23C 2222/28* (2013.01); *B23C 2228/24* (2013.01)

(58) Field of Classification Search
CPC ....... A01G 23/067; B27G 13/08; B27G 13/10
See application file for complete search history.

(56) References Cited

U.S. PATENT DOCUMENTS

| | | | |
|---|---|---|---|
| 4,222,298 | A | 9/1980 | James |
| 4,667,713 | A | 5/1987 | Wright |
| 4,709,737 | A | 12/1987 | Jonsson |
| 5,100,070 | A | 3/1992 | Montgomery, Sr. |
| 5,183,089 | A | 2/1993 | Norlander et al. |

(Continued)

FOREIGN PATENT DOCUMENTS

| | | |
|---|---|---|
| EP | 1214979 A1 | 6/2002 |
| EP | 2777385 A1 | 9/2014 |

OTHER PUBLICATIONS

Extended Search Report issued from the European Patent Office for related Application No. 22168779.1 dated Sep. 14, 2022 (7 Pages).

*Primary Examiner* — Matthew Katcoff
(74) *Attorney, Agent, or Firm* — Michael Best & Friedrich LLP

(57) ABSTRACT

A rotatable cutter wheel of a material reduction machine, the cutter wheel including a drive plate configured to be mounted on the material reduction machine for rotation in a forward rotation direction about a central axis. The drive plate includes a central driveshaft aperture and an outer peripheral edge. A wear plate is positioned along a first axial side of the drive plate and removably coupled to the drive plate. A cutter is removably coupled for rotation with the drive plate via a fastener. A wear insert is positioned to cover a portion of the outer peripheral edge of the drive plate, the wear insert being mounted to the wear plate and held in spaced relation to the outer peripheral edge of the drive plate.

18 Claims, 34 Drawing Sheets

(56) References Cited

U.S. PATENT DOCUMENTS

| | | |
|---|---|---|
| 5,348,065 A | 9/1994 | Meyer |
| 5,484,111 A | 1/1996 | Dorscht et al. |
| 6,131,838 A | 10/2000 | Balvanz et al. |
| 6,394,378 B1 | 5/2002 | Ragnarsson |
| 6,464,157 B1 | 10/2002 | Balvanz et al. |
| 7,100,651 B1 | 9/2006 | Monyak et al. |
| 7,131,606 B2 | 11/2006 | Rogers |
| 7,694,704 B2 * | 4/2010 | Gossett ............... A01G 23/067 144/218 |
| 7,743,803 B2 | 6/2010 | Paumier |
| 8,408,258 B2 | 4/2013 | Leonardi et al. |
| 9,137,954 B2 | 9/2015 | Leonardi et al. |
| 9,686,922 B2 | 6/2017 | Cairns |
| 10,051,798 B2 | 8/2018 | Leonardi et al. |
| 10,926,268 B2 | 2/2021 | Daining et al. |
| 11,045,814 B2 | 6/2021 | Daining et al. |
| 2007/0181725 A1 | 8/2007 | Edwards |
| 2008/0105334 A1 | 5/2008 | Leonardi et al. |
| 2013/0161428 A1 | 6/2013 | Hongo |
| 2017/0087558 A1 | 3/2017 | Davis |
| 2019/0240671 A1 | 8/2019 | Daining et al. |

* cited by examiner

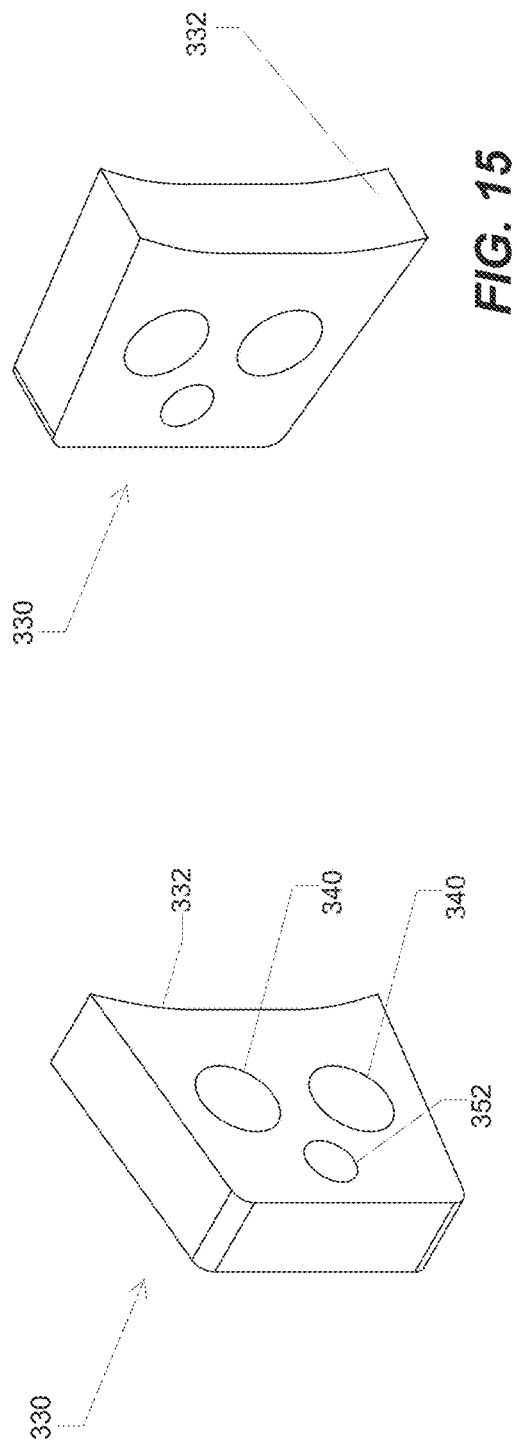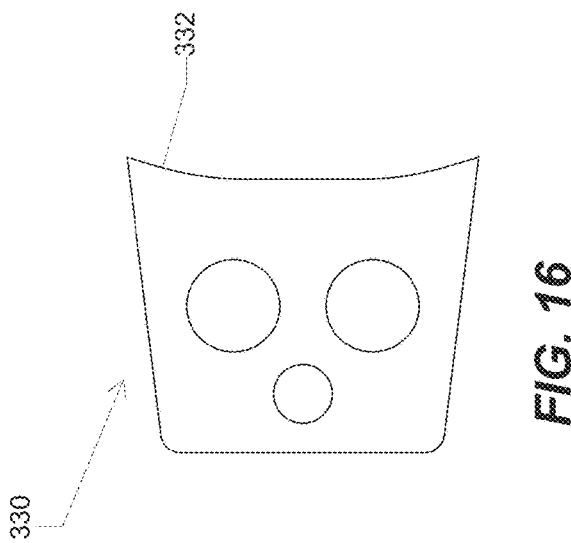

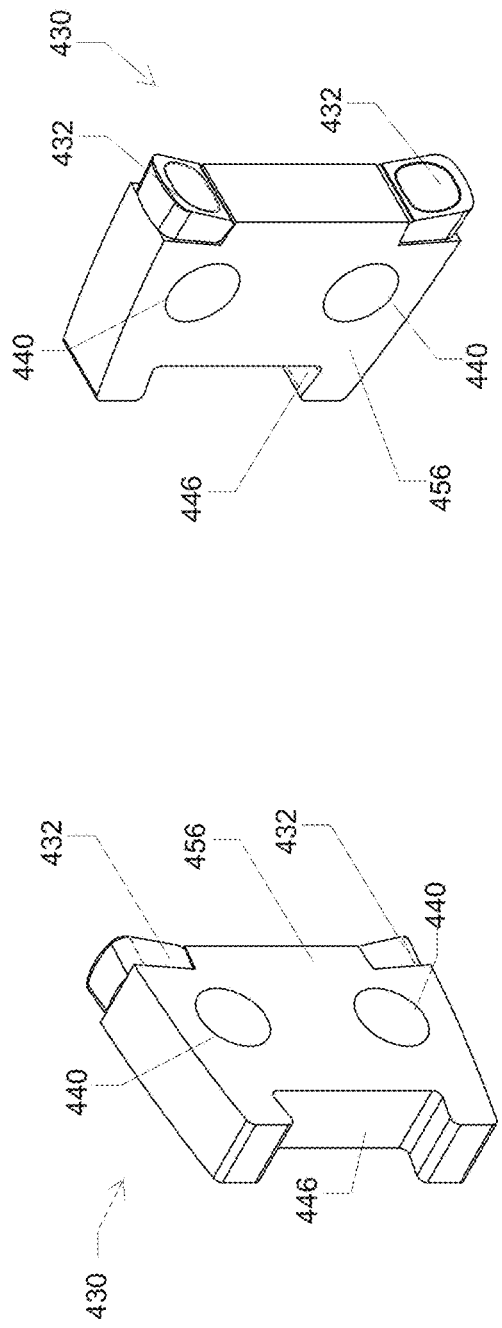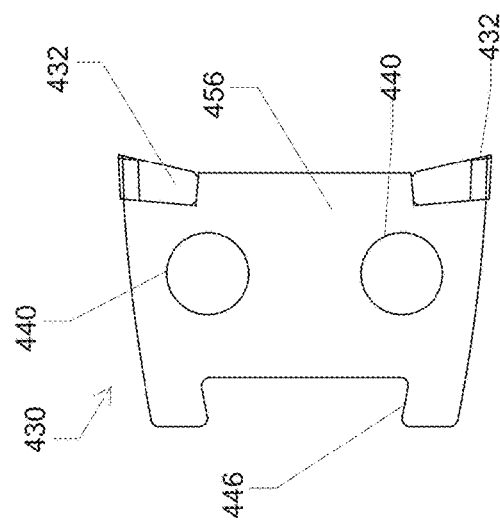

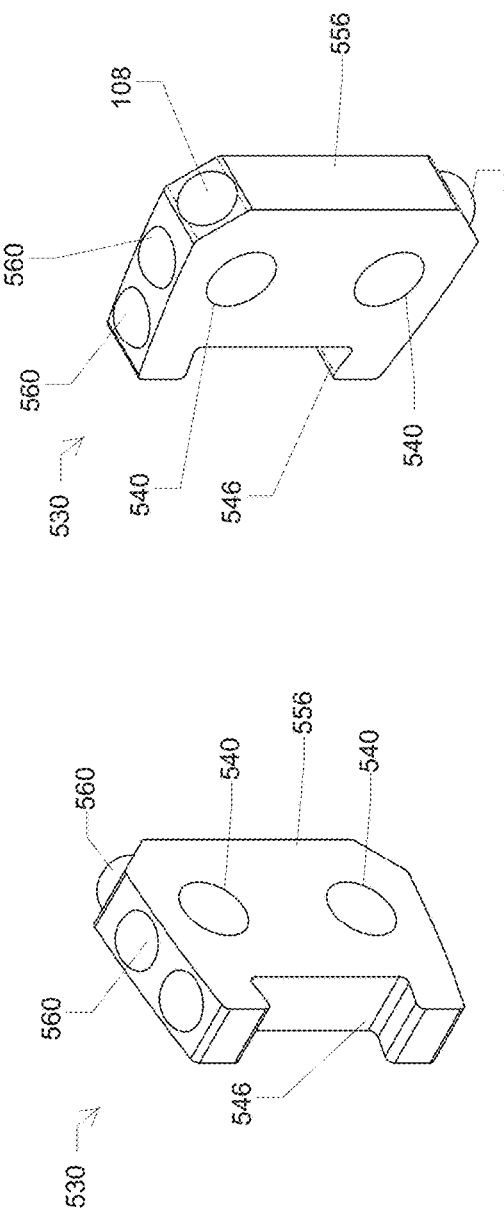
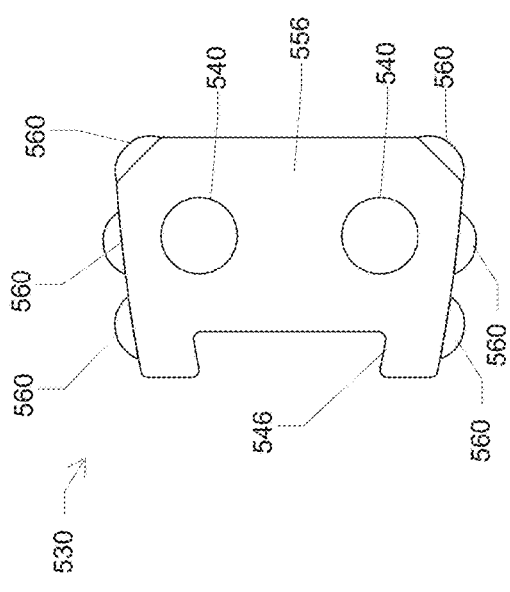
FIG. 24
FIG. 25
FIG. 26

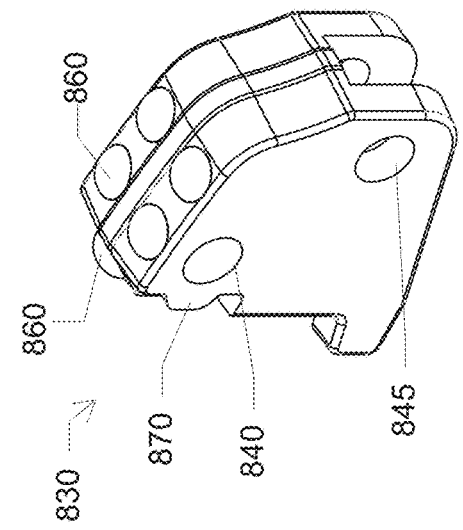
FIG. 40
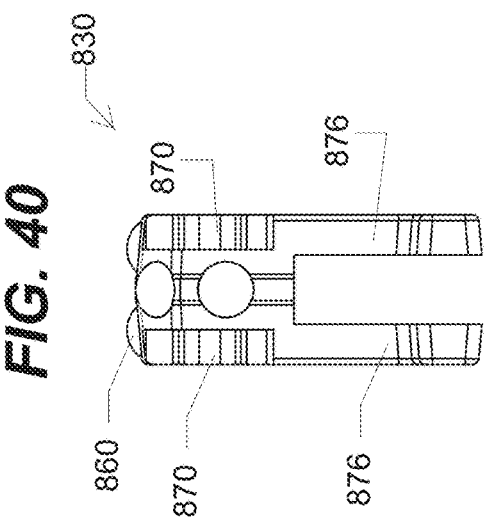
FIG. 43
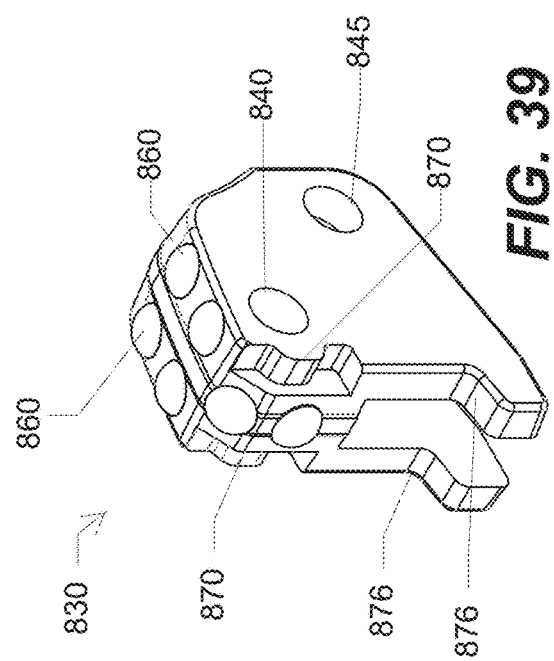
FIG. 39
FIG. 42
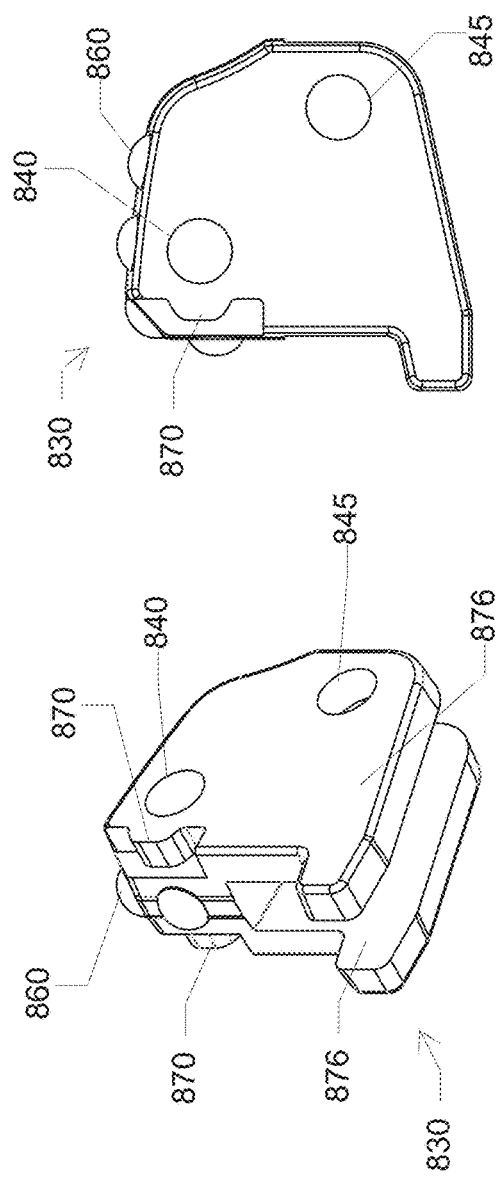
FIG. 41

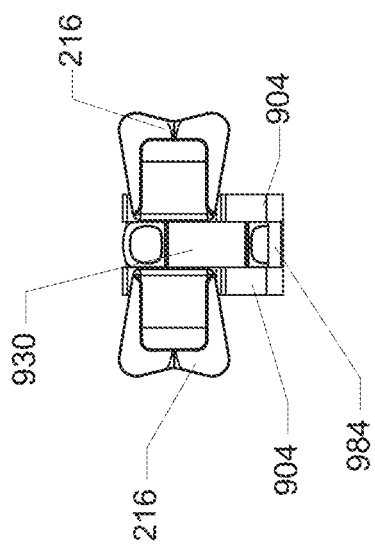
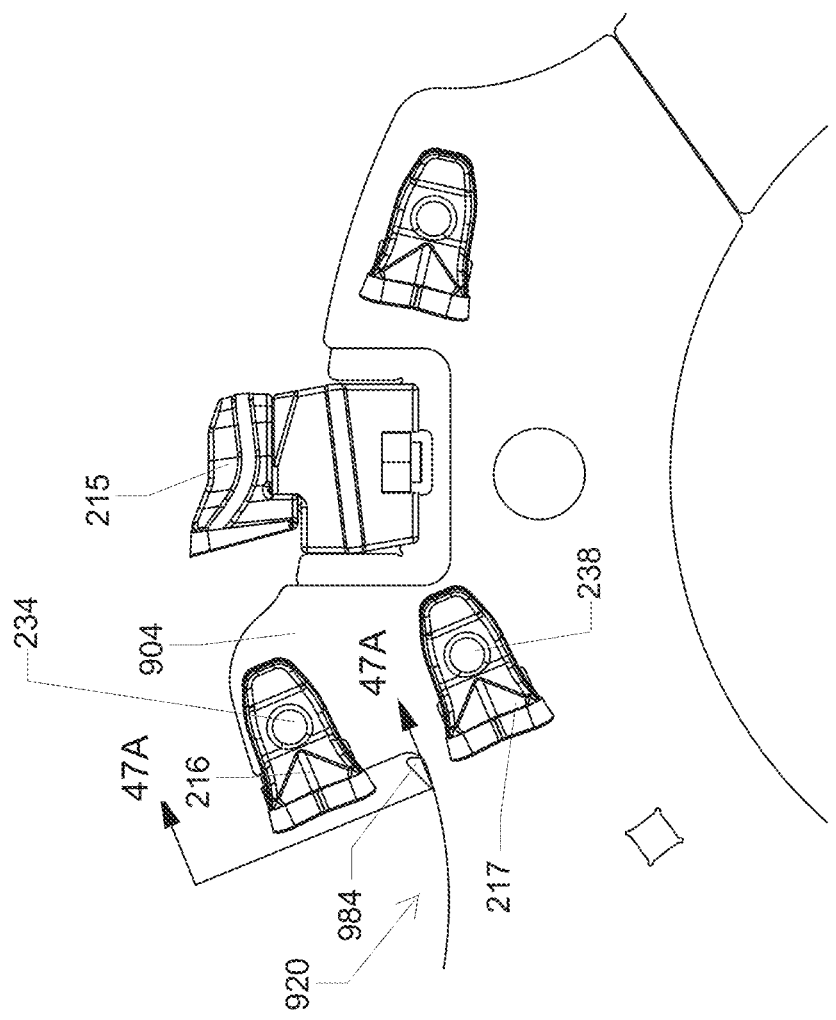
FIG. 47A
FIG. 47

CUTTER WHEEL WEAR INSERTS AND MOUNTING

CROSS-REFERENCE TO RELATED APPLICATIONS

This application claims priority to U.S. Provisional Patent Application No. 63/184,338, filed on May 5, 2021, the entire contents of which are incorporated by reference herein.

BACKGROUND

The present disclosure relates generally to material reduction machines and processing tools (e.g., cutters) that are adapted to remove items such as tree stumps. Various methods and machines for removing or reducing the size of stumps are known. Examples of stump reduction machines are disclosed in U.S. Pat. No. 6,014,996 titled "Control System for Stump Cutters" assigned to Vermeer; U.S. Pat. No. 7,011,124 titled "Stump Grinder Having Automatic Reversing Feed Assembly" assigned to Tramor; U.S. Pat. No. 6,026,871 titled "Stump Cutter Safety System" assigned to Rayco; and U.S. Pat. No. 6,230,770 titled "Stump Chipper and Method for the Operation Thereof" assigned to Vermeer-Holland. Aspects discussed herein also apply to material reduction machines that use a drum, such as horizontal grinders, tub grinders, or mulchers like those discussed in U.S. Pat. Nos. 6,843,435; and 5,950,942. More particularly, aspects of the present disclosure may relate to toothed cutter wheels similar to those disclosed in one or both of Vermeer's U.S. Patent Application Publication No. 2019/0240671 and 2019/0240861, the entire contents of both of which are incorporated by reference herein. In such examples, the cutter wheel includes a plurality of chip evacuation notches or gullets on the perimeter of the cutter wheel.

SUMMARY

In a first aspect, the invention provides a rotatable cutter wheel of a material reduction machine, the cutter wheel including a drive plate configured to be mounted on the material reduction machine for rotation in a forward rotation direction about a central axis. A gullet is defined in an outer peripheral edge of the drive plate, the gullet having an increasing depth from a leading portion to a trailing portion. A cutter is removably coupled to the drive plate with a fastener at a cutter mount formed at the outer peripheral edge of the drive plate. The cutter mount is at the trailing portion of the gullet. A wear insert is positioned at the trailing portion of the gullet adjacent the cutter.

BRIEF DESCRIPTION OF THE FIGURES

The foregoing and other features and advantages of the disclosure will be apparent from the more particular description of the embodiments, as illustrated in the accompanying drawings, in which like reference characters refer to the same parts throughout the different figures. The drawings are not necessarily to scale, emphasis instead being placed upon illustrating the principles of the disclosure.

FIG. 14 is a left-rear perspective view of an alternate wear insert embodying aspects of the present invention.

FIG. 15 is a front-left perspective view of the wear insert of FIG. 14.

FIG. 16 is a left side elevation view of the wear insert of FIG. 14.

FIG. 21 is a left-rear perspective view of the wear insert of the cutter wheel of FIGS. 17 and 18.

FIG. 22 is a front-left perspective view of the wear insert of FIG. 21.

FIG. 23 is a left side elevation view of the wear insert of FIG. 21.

FIG. 24 is a left-rear perspective view of an alternate wear insert for the cutter wheel of FIGS. 17 and 18.

FIG. 25 is a front-left perspective view of the wear insert of FIG. 24.

FIG. 26 is a left side elevation view of the wear insert of FIG. 24.

FIG. 39 is a front-right perspective view of the wear insert of the cutter wheel of FIG. 35.

FIG. 40 is a rear-right perspective view of the wear insert of FIG. 39.

FIG. 41 is a front-right perspective view taken from the underside of the wear insert of FIG. 39.

FIG. 42 is a right side elevation view of the wear insert of FIG. 39.

FIG. 43 is a front elevation view of the wear insert of FIG. 39.

FIG. 47 is a detail side elevation view of the peripheral portion of the cutter wheel shown in FIG. 44A.

FIG. 47A is a section view taken along plane 47A-47A of FIG. 47 to show a front face of a set of cutters on the cutter wheel, along with the wear insert of FIG. 45.

DETAILED DESCRIPTION

Figure 1:
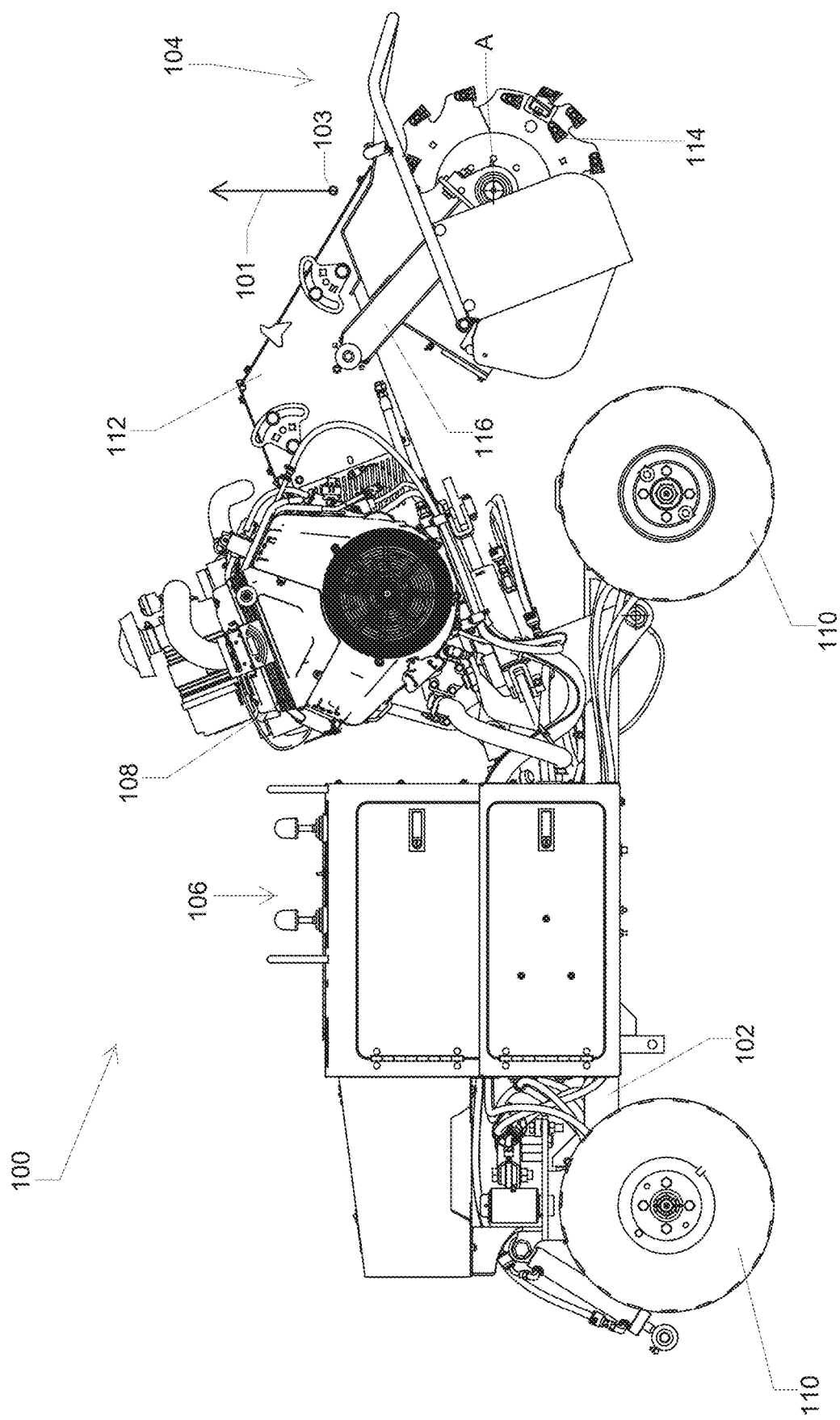
FIG. 1 illustrates an exemplary material reduction machine including a cutter wheel embodying aspects of the present invention.

FIG. 1 depicts a material reduction machine 100. The material reduction machine 100 includes a mainframe 102 and a cutter system 104 attached thereto. The mainframe 102 includes an operator control portion 106 and a set of ground engaging members 110, e.g., wheels. An operator positioned at the operator control portion 106 can control operation of the material reduction machine 100, although remote control of the material reduction machine 100 may also be enabled through one or more remote controller, not shown. The material reduction machine 100 can be a vehicle, providing accommodation for the operator, for example in a cab as shown in Vermeer's U.S. Patent Application Publication No. 2019/0240671 and 2019/0240861, or the material reduction machine 100 can instead be configured as a walk-behind or walk-beside machine as shown in FIG. 1. The material reduction machine 100 includes an engine 108, which may be a fuel-burning internal combustion or alternative energy power plant, that powers the material reduction machine 100. The wheels or alternate ground engaging members 110 enable the material reduction machine 100 to be maneuvered across a working terrain by power output from the engine 108. The engine 108 may also power the cutter system 104, which is described in further detail below.

The cutter system 104 is coupled to the mainframe 102 via a sub-frame 112. The sub-frame 112 is configured to raise and lower a cutter wheel 114 relative to the mainframe 102, such as along axis 101 within FIG. 1. The sub-frame 112 is further configured to swing the cutter wheel 114 left and right relative to the mainframe 102, such as along axis 103 within FIG. 1. It should be appreciated that the axis 101 and the axis 103 need not be entirely perpendicular to one another, or perpendicular to the mainframe. In other words, the cutter wheel 114 may move closer and further away from the mainframe 102 when either raising, lowering, swinging left, or swinging right, such as in an arcuate motion. The sub-frame 112 may further support a drive system 116 that powers and rotates the cutter wheel 114. The drive system 116 may include a driveshaft at the axis of rotation A ("central axis") of the cutter wheel 114 and associated drive system components for rotating the driveshaft and thereby rotating the cutter wheel, and controls that are operable by the operator of the material reduction machine 100.

Figure 2:
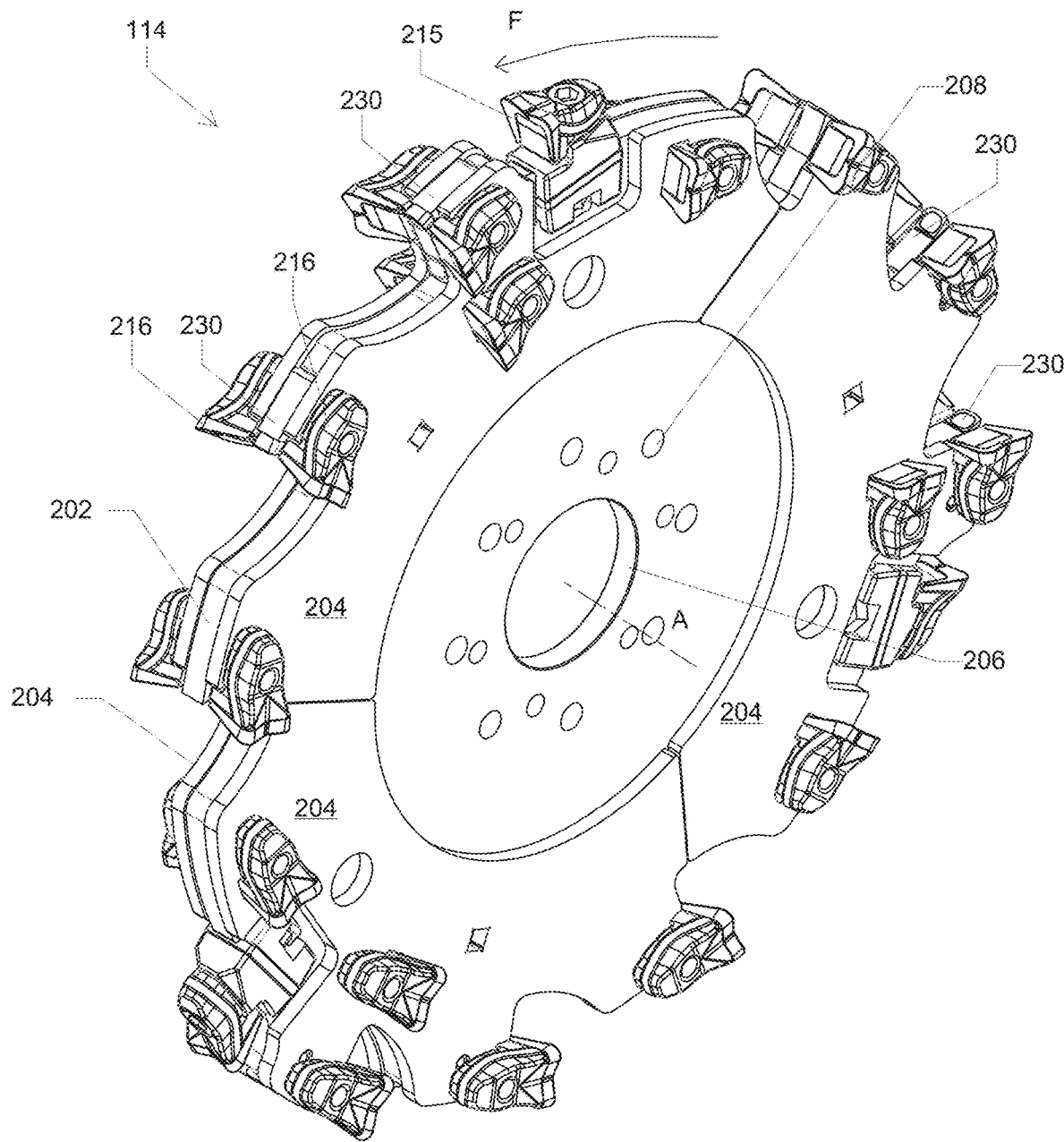
FIG. 2 is a perspective view of the cutter wheel of FIG. 1.
Figure 2A:
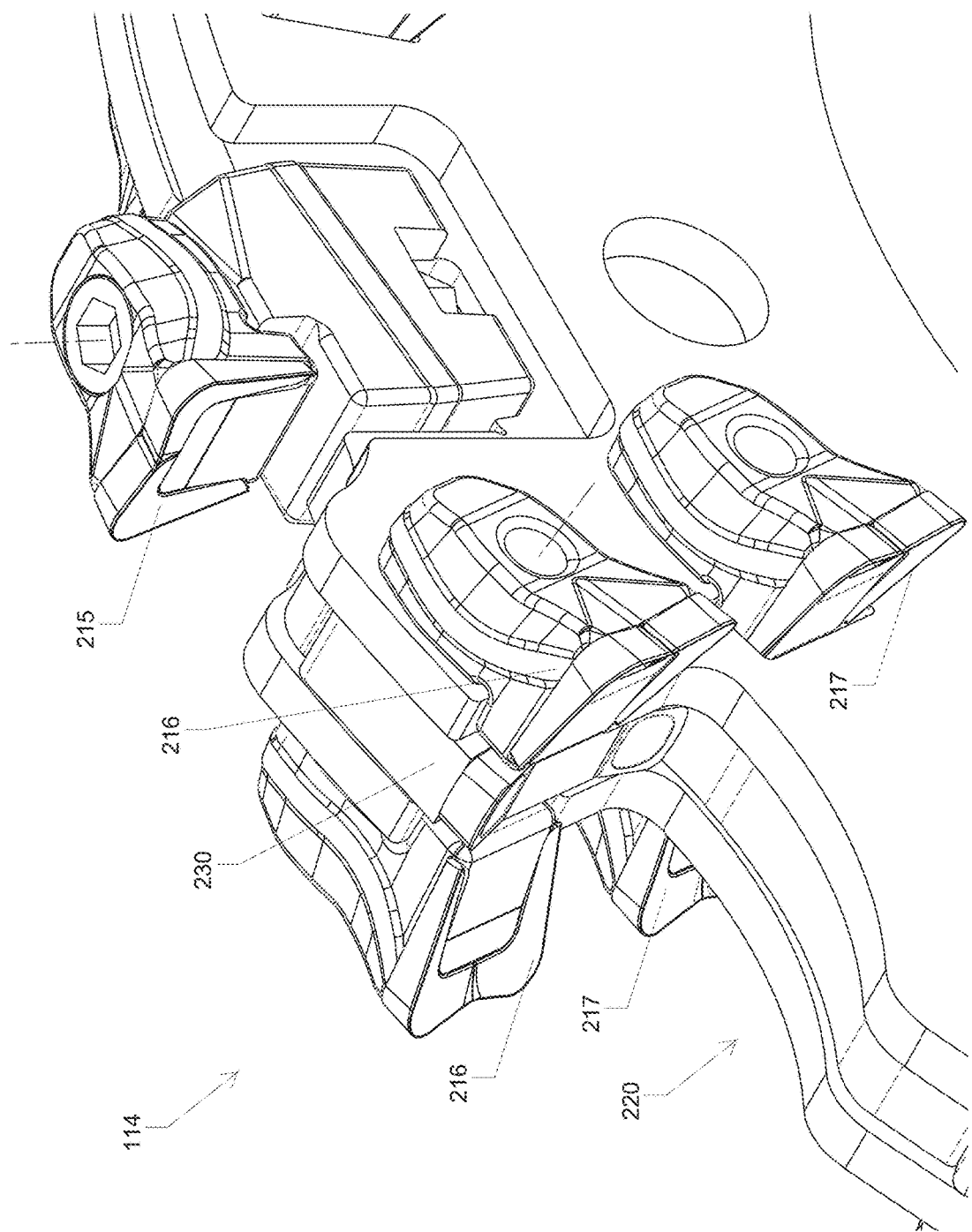
FIG. 2A is a detail view of a peripheral portion of the cutter wheel of FIG. 2.
Figure 3:
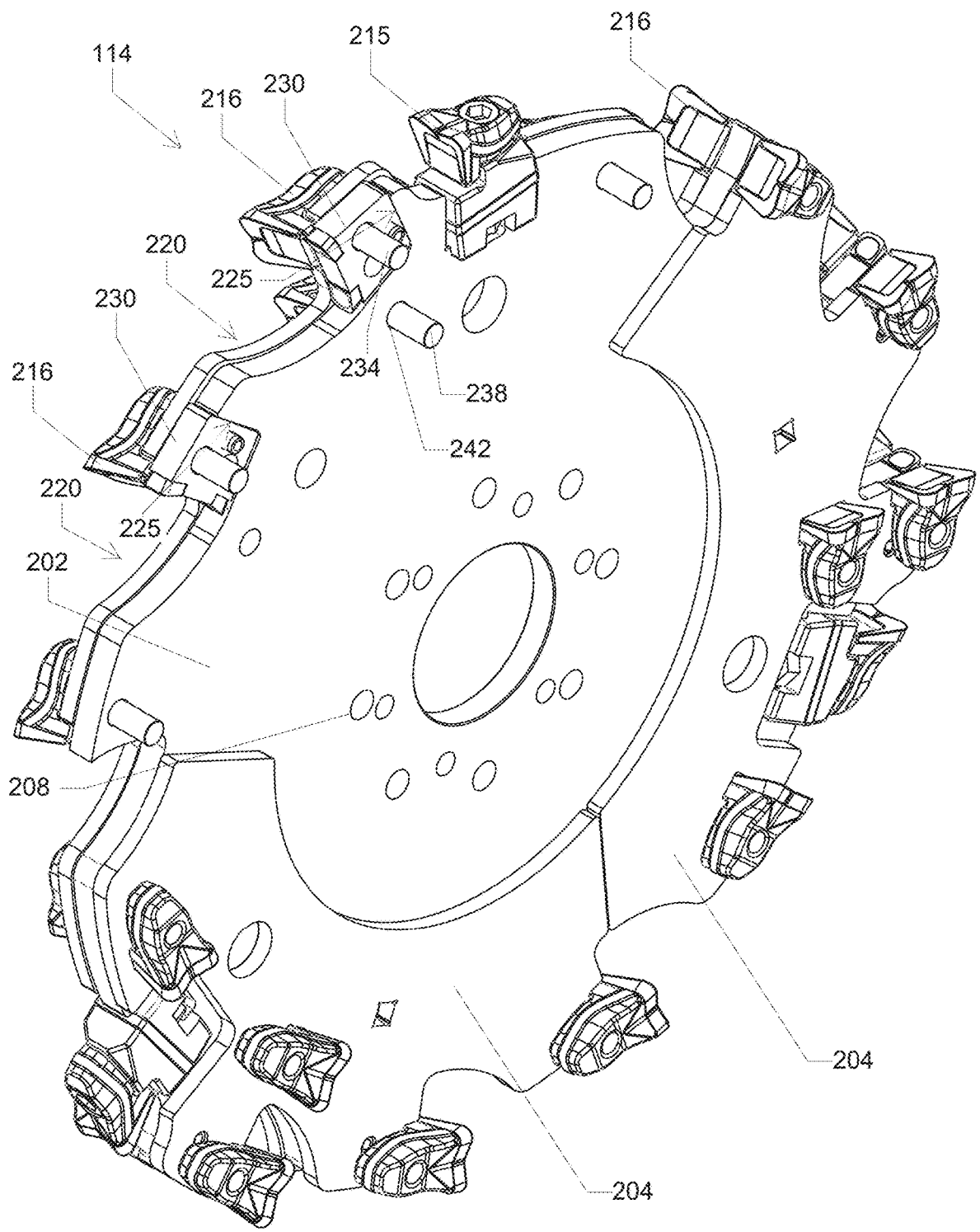
FIG. 3 is a perspective view of the cutter wheel of FIG. 2, with one side wear plate removed to expose a separate wear insert embodying aspects of the present invention.
Figure 4:
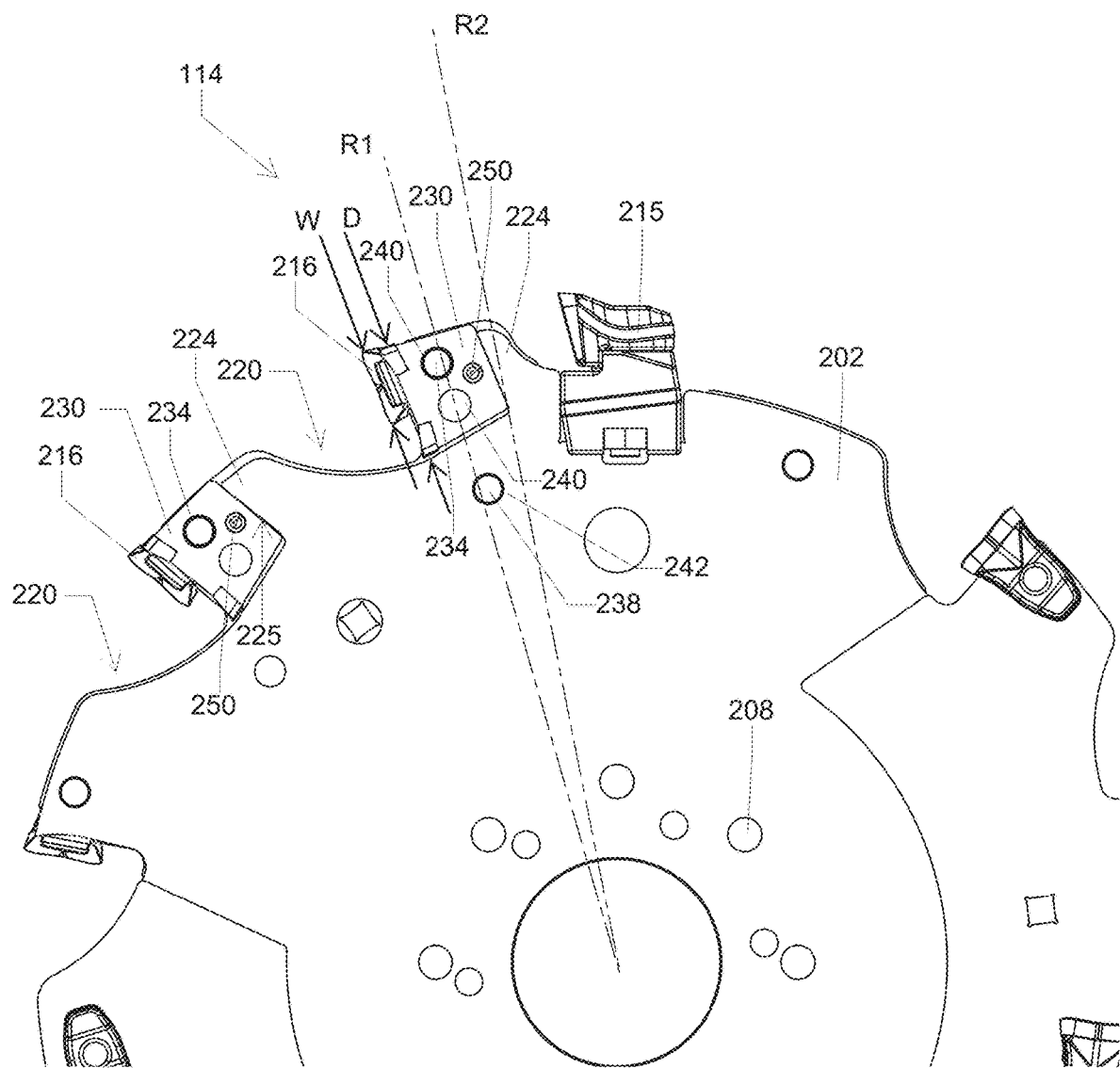
FIG. 4 is a side elevation view of the cutter wheel of FIG. 2, with the side wear plate removed as in FIG. 3.
Figure 6:
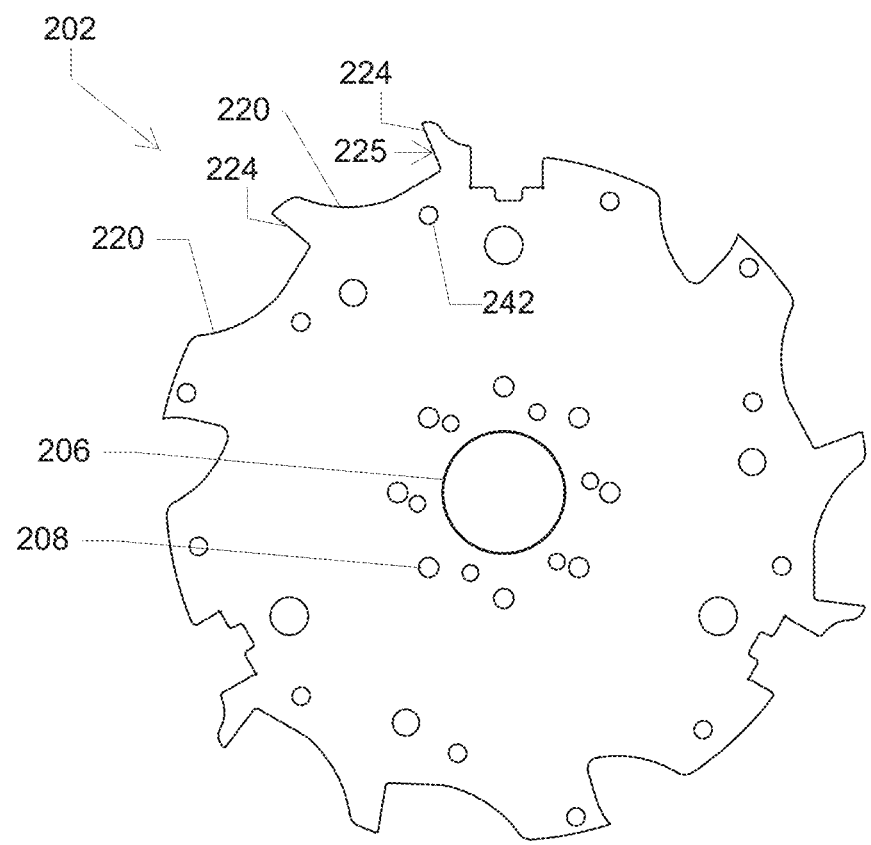
FIG. 6 is a side elevation view of a drive plate of the cutter wheel of FIG. 2.

Referring to FIGS. 2-8, the cutter wheel 114 is a multi-piece assembly including a drive plate 202, and at least one wear plate 204 located on each side or face of the drive plate 202. In FIG. 2, it is shown that each side or face of the drive plate 202 has multiple (e.g., three) wear plates 204. It should be appreciated that there may be only a single wear plate 204 located on each side or face of the drive plate 202, or more or less than three. FIGS. 3 and 4 illustrate one of the wear plates 204 removed to better illustrate the drive plate 202 as well as other features described below. FIG. 6 illustrates the drive plate 202 by itself, with all other parts of the cutter wheel 114 removed therefrom. The drive plate 202 is configured to couple to the drive system 116. For example, the drive plate 202 includes a driveshaft aperture 206 and a plurality of driveshaft mounting apertures 208 each of which are configured such that driving torque is transferred from the drive system 116 to the cutter wheel 114. In other embodiments, the driveshaft may be a stub shaft which only attaches to one side of the drive plate 202. The material of the drive plate 202 may have a lower carbon content than the material of the wear plates 204. This lower carbon content of the drive plate 202 facilitates machinability of the drive plate 202.

Figure 7:
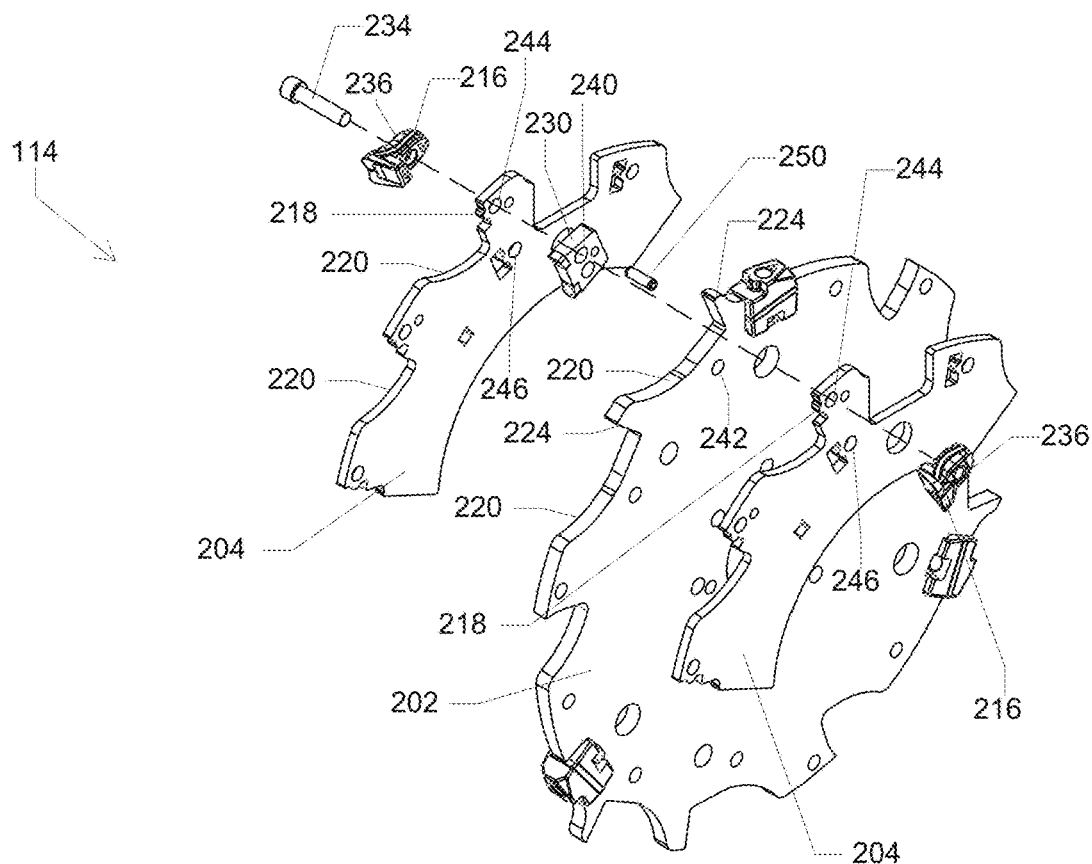
FIG. 7 is an exploded perspective view of the cutter wheel of FIG. 2, including selected cutters, wear plates, and the wear insert.

The drive plate 202 supports a plurality of cutters 215, 216, 217 at various positions at or near the outer peripheral edge of the cutter wheel 114. The cutters 215, 216, 217 like the drive plate 202 and wear plates 204, can be similar to those elements disclosed in Vermeer's U.S. Patent Application Publication No. 2019/0240671 and 2019/0240861, among other forms. For example, some of the cutters 215 may be arranged on a cutter mount at the outer peripheral edge of the cutter wheel 114 to extend radially therefrom, forming plunge cutters along the central plane P (FIG. 8), while other ones of the cutters 216 may be situated in pairs to extend axially opposite one another to form an aligned pair of side-mounted cutters. Each of the side-mounted cutters 216 is mounted on a mounting boss 218 formed in the respective one of the wear plates 204 as shown in FIG. 7. As shown, there may be circumferential positions on the cutter wheel 114 where there is both a first pair of cutters (e.g., a radially outer pair of side-mounted cutters 216) and a second pair of cutter (e.g., a radially inner pair of side-mounted cutters 217). The various cutters 215, 216, 217 may be identical in construction to allow for part similarity and exchangeability among positions on the cutter wheel 114. As illustrated, the cutters 215, 216, 217 can each have a body supporting a cutter tip that forms a scalloped and M-shaped edge profile, with two leg portions and an upper or crown portion extending between the two leg portions. The crown portion defines in its upper surface a concavity that reduces drag and facilitates material evacuation during cutting. The cutter tip front face or cutting face can be cupped or concave such that the outermost edges of the leg and crown portions define respective cutting edges of the cutter tip. However, this is merely one example of a cutter construction among many possible alternatives.

In some areas, the wear plate 204 may have a diameter or outer dimension that is the same or greater than the diameter or outer dimension of the drive plate 202. However, the profile of the cutter wheel 114 is non-circular in the illustrated embodiment. Rather, the profile traced by the peripheral outer edge of the drive plate 202 can have a convoluted path including various mounts for the cutters 215, 216. The peripheral outer edge can further include plurality of chip evacuation notches or gullets 220, where a gullet 220 has (in a direction opposite the forward rotation direction) a radial dimension gradually reducing toward and up to one of the cutter mounts 224. Thus, the gullet 220 has a depth D that increases gradually to a maximum in a direction opposite the forward rotation direction, the depth D measured radially from an outer envelope circle of the cutter wheel 114 adjacent the gullet 220. The outer envelope circle is defined as the circle occupied by the cutter wheel 114 when rotated about the central axis A. The gullet 220 can be formed by the drive plate 202, although the adjacent wear plates 204 may also be considered to form part of the gullet 220 in practice, as they generally follow the same contour in side view. The gullets 220 allow cut material to evacuate through the gullets 220 and release on the other side of the cutter wheel 114 as the cutter wheel is traversing the material. The gullets 220 also reduce the recirculation of material during operation of the cutter wheel 114. As illustrated, the gullet 220 of the drive plate 202 extends to a mount 224 for indirectly mounting the side-mounted cutters 216. The gullet 220 has a back portion forming a cutaway area for a wear insert 230 described in further detail below, the wear insert 230 supporting the cutters 216. The mount 224 can form a forward-facing surface 225, e.g., a straight wall, at the trailing end of the gullet 220. Each gullet 220 as illustrated can include both an arcuate segment and a straight segment trailing the arcuate segment. The straight gullet segment may extend along a deepest portion (at maximum depth D) of the gullet 220. In the illustrated embodiment, the maximum depth D of the gullet is may be 1-1.5 times a maximum width W of each of the cutters 216. In the case of the side-mounted cutters 216, the width W and the gullet depth D are both measured along a radial direction extending to the central axis A.

Figure 5A:
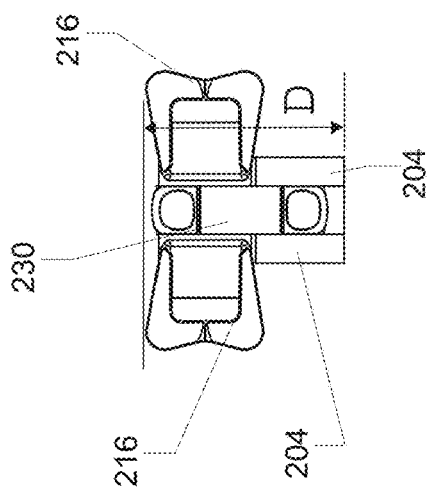
FIG. 5A is a section view taken along plane 5A-5A of FIG. 5 to show a front face of a set of cutters on the cutter wheel, along with the wear insert of FIG. 3.
Figure 5:
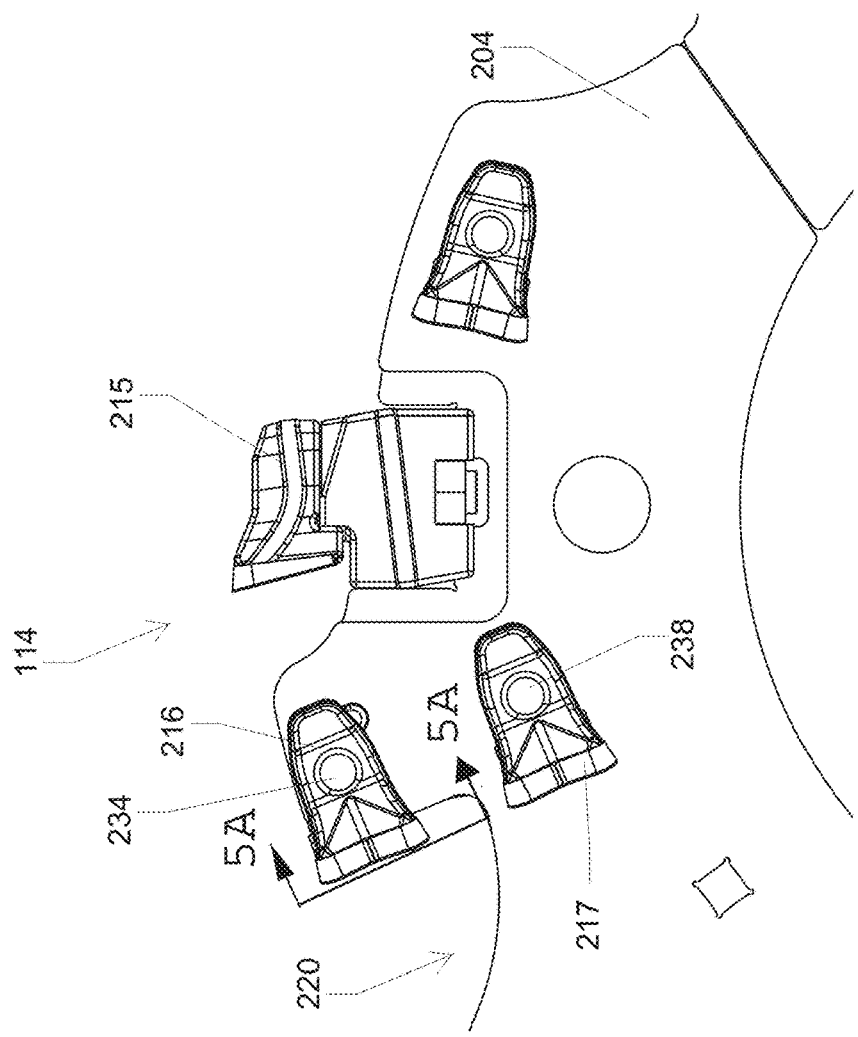
FIG. 5 is a detail side elevation view of the peripheral portion of the cutter wheel shown in FIG. 2A.

Although the wear plates 204 can effectively reduce the amount of wear borne by the drive plate 202, the gullets of the kind shown can present high-traffic areas for chip flow. Thus, in order to further inhibit wear of the drive plate 202, the cutter wheel 114 includes one or more wear inserts 230. The wear inserts 230 are located in the gullet 220 of the cutter wheel 114 near the base of at least some of the cutter(s). As illustrated, the wear inserts 230 are particularly in the area of, e.g., at the base of, the radially outer and radially inner aligned pairs of side-mounted cutters 216, 217, but may be provided in other configurations in alternate constructions. The wear insert 230 is flanked on both axial sides by a pair of side-mounted cutters 216 (FIG. 5A). The wear insert 230 covers, for example completely covers, a forward-facing portion (e.g., forward-facing surface 225) of the drive plate 202 adjacent the cutters 216. As viewed in FIG. 5A (perpendicular to the plane 5A that extends along a radial line in front of the cutting faces of the cutters 216), the wear insert 230 is positioned between the side-mounted cutters 216 and between the corresponding wear plates 204. A radial reference line R1 intersects the side-mounted cutters 216 and the wear insert 230 in the side view of FIG. 4, along the central axis A. Due to the second (radially inner) pair of side-mounted cutters 217 being offset in the radial direction, the same radial reference line R1 also intersects the second pair of side-mounted cutters 217. The radial reference line R1 can be one of a plurality of radial reference lines, defining a range of overlap between the wear insert 230 and the cutters 216, and the range may cover a majority of the wear insert 230 and a majority of the cutters 216. The wear inserts 230 are positioned relative to the drive plate 202 to define little to no extension beyond the rotational envelope of the drive plate 202, the rotational envelope being defined as the space occupied by the drive plate 202 when rotated about the central axis A. To the extent there is extension of the wear inserts 230 outside the drive plate rotational envelope, the total frontal area extension of each wear insert 230 is less than the total frontal area extension of each of the cutters 215, 216, 217, and particularly less than the total frontal area extension of each of the side-mounted cutters 216 that directly flank the wear insert 230. Frontal area can be taken as the area as seen in a cross-section view along a radial reference line positioned at a front edge of the component (cutter 215, 216, 217 or wear insert 230), where the forward rotation direction F comes directly out of the sheet. Alternately, the frontal area can be taken as the area as seen in a cross-section view along a reference line positioned parallel to the front edge of the component, as the front edge may not lie directly along a radial reference line due to a rake angle.

Figure 13:
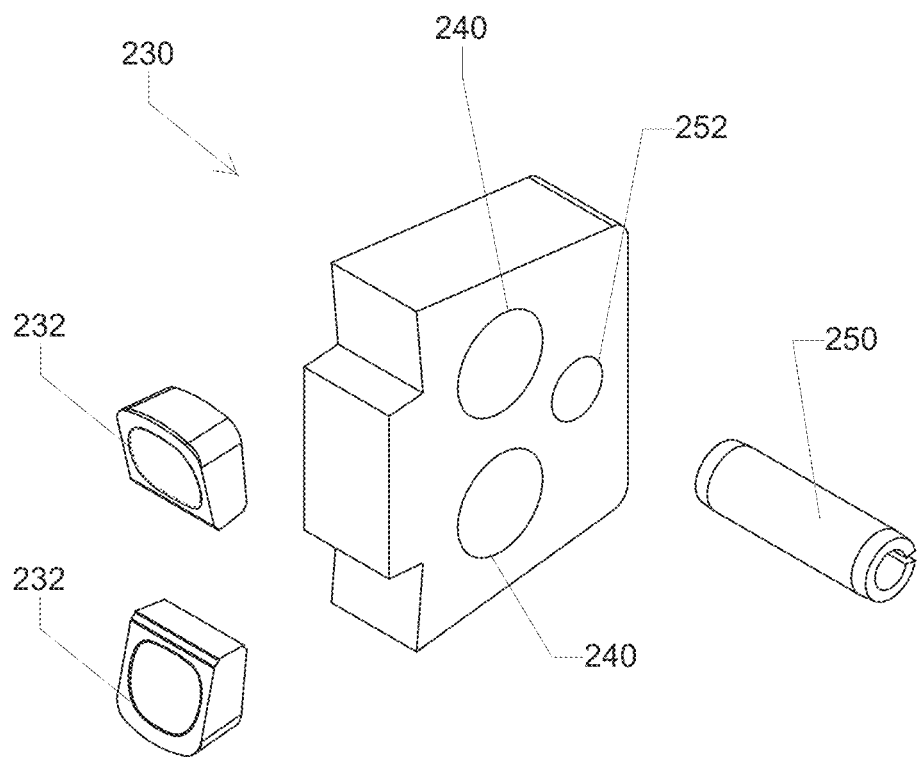
FIG. 13 is an exploded perspective view of the wear insert of FIG. 9.

The primary purpose of the wear insert 230 is to prevent wear of the center drive plate 202 caused by chip flow during cutting where the cutter wheel 114 rotates at high speed in the forward direction to continuously engage material to be reduced. The wear insert 230 is intended to provide a wear surface for passing material, it is not intended to cut material. However, in some situations, a small amount of material may be cut by the wear insert 230 due to its location and configuration. The wear insert 230 is positioned such that the forward-facing surface 225 of the drive plate 202 at the trailing end of the gullet 220 is mostly or completely covered by the wear insert 230. Thus, the wear insert 230 effectively forms the trailing end of the gullet 220 for the assembled cutter wheel 114. The wear insert 230 also occupies the maximum depth straight portion of the gullet 220 extending between the arcuate portion and the trailing end. As described below, the wear insert 230 is configured and mounted to the cutter wheel 114 in a way that renders it reversible/flippable to improve life and wear. The wear insert 230 is removable and replaceable, without replacing the entire cutter wheel 114. The wear insert 230 may have at least one hardened or wear resistant element 232 (such as carbide) thereon. The wear resistant element 232 may be shaped in a variety ways, may be a single piece or multiple pieces, or may be omitted from the wear insert 230. As shown, there are two identical carbide wear resistant element 232 or tips provided symmetrically at opposite ends (radially inner and outer) on the front-facing portion of a body 256 of the wear insert 230, the body 256 being formed of a different material that is less hard and less wear resistant. As shown in FIG. 13, the two carbide wear resistant elements 232 are positioned on respective ledges or cutouts provided in the body 256.

Figure 8:
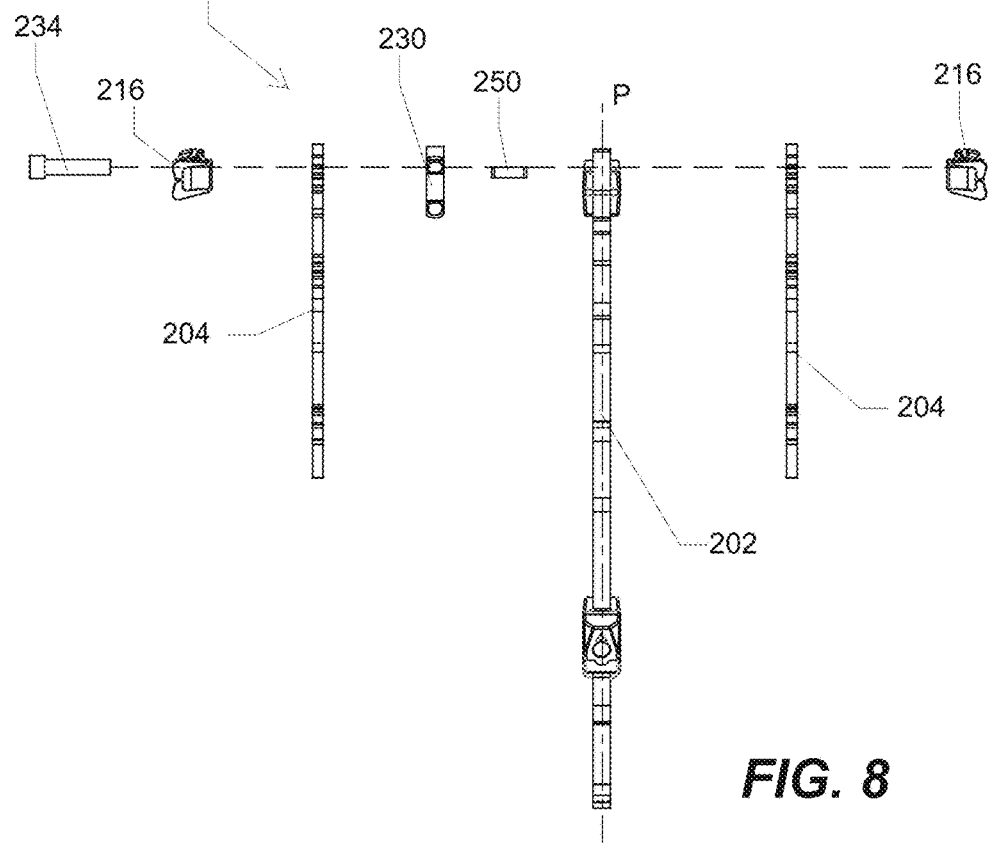
FIG. 8 is an exploded front elevation view of the cutter wheel of FIG. 2, including selected cutters, wear plates, and the wear insert shown in FIG. 7.
Figure 9:
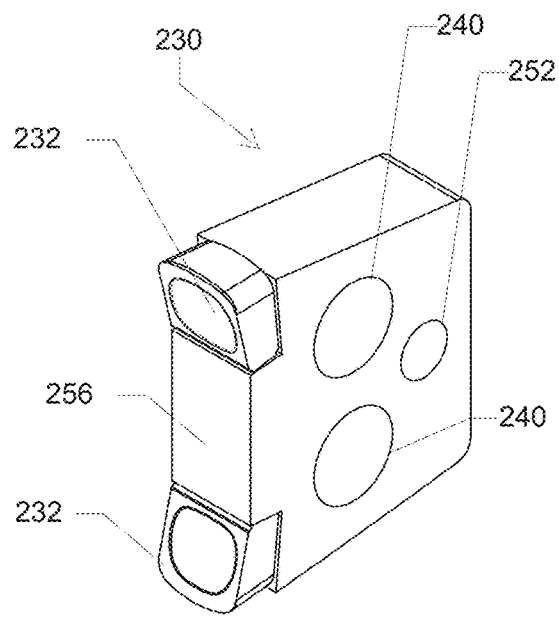
FIG. 9 is a front-right perspective view of the wear insert of FIGS. 3, 5A, 7 and 8.
Figure 10:
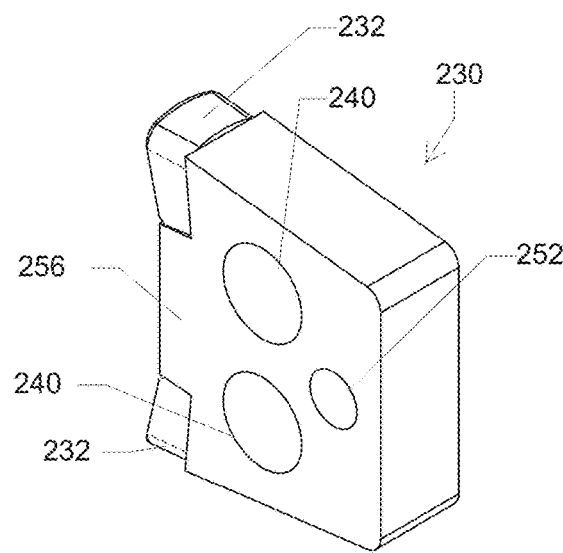
FIG. 10 is a rear-right perspective view of the wear insert of FIG. 9.
Figure 11:
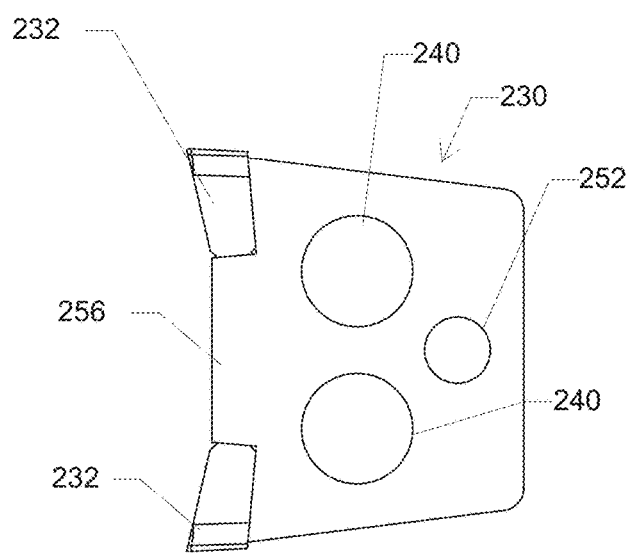
FIG. 11 is a right side elevation view of the wear insert of FIG. 9.
Figure 12:
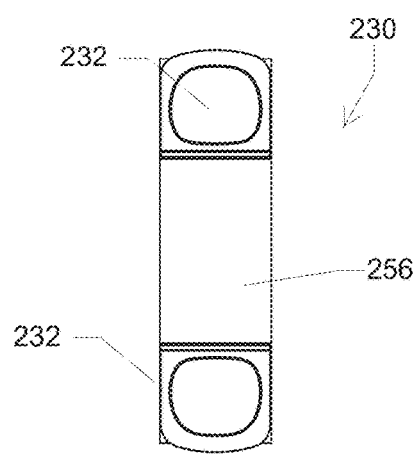
FIG. 12 is a front elevation view of the wear insert of FIG. 9.

The wear inserts 230 can be mounted to the drive plate 202 in any number of ways. As best shown in FIGS. 7 and 8, the illustrated embodiment provides a single (threaded) fastener 234 that extends parallel to the central axis A of the cutter wheel 114 to extend through both of a pair of the side-mounted cutters 216 (e.g., radially outer pair) and the wear insert 230 via respective apertures therein (e.g., aperture 236 in each cutter 216 and aperture 240 in the wear insert 230). In other constructions, more than one threaded fastener may be used. Notably, while the threaded fastener 234 also extends through respective apertures 244 in the wear plates 204, it does not extend through any aperture in the drive plate 202 such that the cutters 216 and the wear insert 230 mounted by the fastener 234 are indirectly mounted to the mount 224 on the drive plate 202. The fastener 234 creates a clamping force that is exerted on the wear insert 230, the wear plates 204 and the cutters 216. As such, these cutter-mounting and wear insert-mounting fasteners 234 may exhibit a clamping force that helps hold the wear plate 204 in place relative to the drive plate 202. Additional fasteners may secure the wear plates 204 to the drive plate 202. For example, a second (threaded) fastener 238 that mounts the radially inner side-mounted cutters 217 can extend through apertures 242, 246 in both the drive plate 202 and the wear plates 204, thereby providing a primary means of securement for the wear plates 204 to the drive plate 202. The wear inserts 230 can be secured in a configuration in which the wear insert 230 contacts the drive plate 202 or a configuration in which spacing or a gap is maintained therebetween. As can be seen from FIG. 4, among others, the wear inserts 230 can be positioned at the trailing end of the respective gullets 220. The trailing end of each gullet 220 can include an approximately rectangular corner (e.g., 90 degrees +/−5 degrees) accommodating the wear insert 230. The mount 224 at the trailing end of the gullet 220 can have a front-facing surface that is predominantly radial, although a slight forward rake (e.g., 15 degrees or less) is shown with respect to the radial reference line R2 in FIG. 4.

In addition to the threaded fastener 234 that extends through the cutters 216 and the wear insert 230, the wear insert 230 can receive an additional or secondary fastener such as a roll pin 250 that acts to position the wear insert 230 and maintain assembly with respect to the cutter wheel 114 (e.g., directly to the wear plates 204). In the case of the roll pin 250, the additional fastener provides positioning capability without clamping force, as clamping force is provided via the threaded fastener 234 that acts as a primary fastener. The roll pin 250 is received by an aperture 252 in the wear insert 230 and by respective apertures in the adjacent wear plates 204. As shown in detail views FIGS. 9-13 of the wear insert 230, the apertures 240, 252 for the threaded fastener 234 and the roll pin 250 can be formed in the body 256 of the wear insert 230. The additional aperture 240 in the body 256 of the wear insert 230 affords the ability to reverse the wear insert 230 by changing which aperture 240 is aligned with the fastener 234. In other constructions, the wear insert 230 can include a single aperture 240 (e.g., centered or offset) for the fastener 234.

As mentioned above, the wear inserts 230 can take a number of various configurations. For example, the wear resistant element(s) 232 may be shaped in a variety ways, may be a single piece or multiple pieces, or may be omitted from the wear insert 230. FIGS. 14-16 illustrate an alternate wear insert 330 in which there are no separate wear resistant elements secured to a body. Rather, the wear insert 330 may have a monolithic body construction (e.g., steel), including an exposed front-facing portion exposed to the gullet 220 when the cutter wheel 114 is assembled with the wear insert 330. The front-facing portion can be overall concave, including straight and/or curved segments when viewed in side elevation as shown in FIG. 16. The wear insert 330 can include one or more fastener apertures 340 similar to the fastener apertures 240 described above for the threaded fastener 234, and may also optionally include an additional aperture 352 similar to the aperture 252 described above for the roll pin 250. As such, the wear insert 330 may be assembled on the cutter wheel 114 in the same way as described for the wear insert 230. The wear insert 330 can be hardened or made from a wear resistant material, including various grades of steel alloy.

Figure 17:
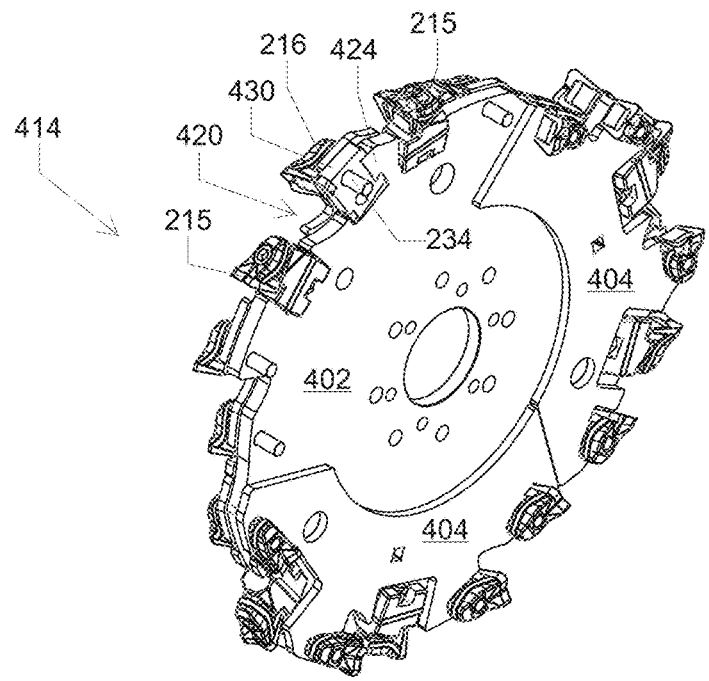
FIG. 17 is a perspective view of an alternate cutter wheel embodying aspects of the present invention. One side wear plate is removed to expose an alternate wear insert embodying aspects of the present invention.
Figure 18:
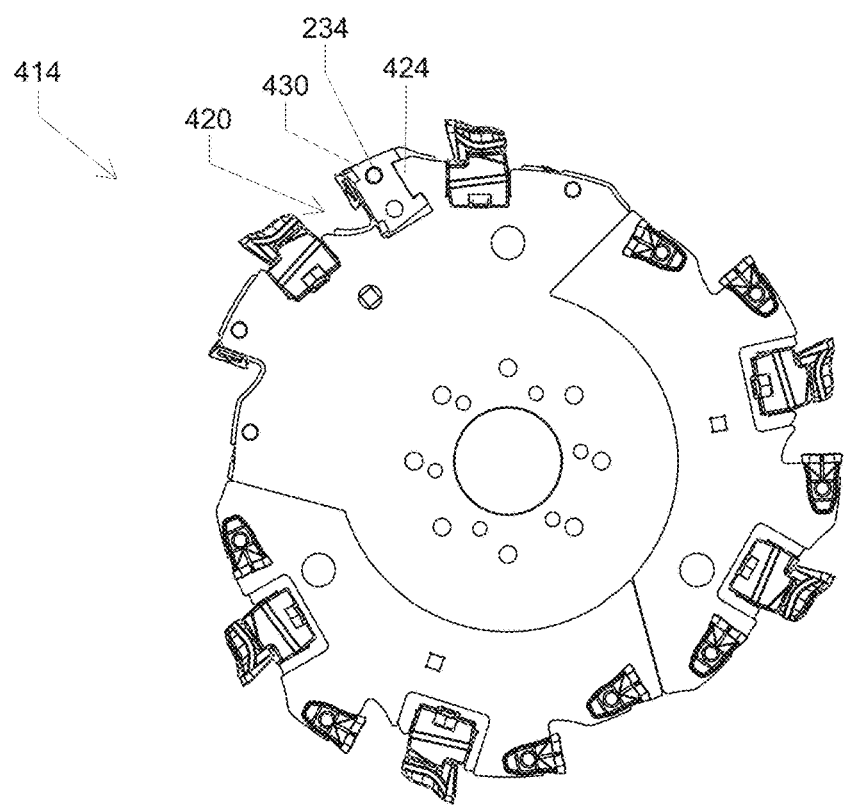
FIG. 18 is a side elevation view of the cutter wheel of FIG. 17, with the side wear plate removed to expose the wear insert.
Figure 19:
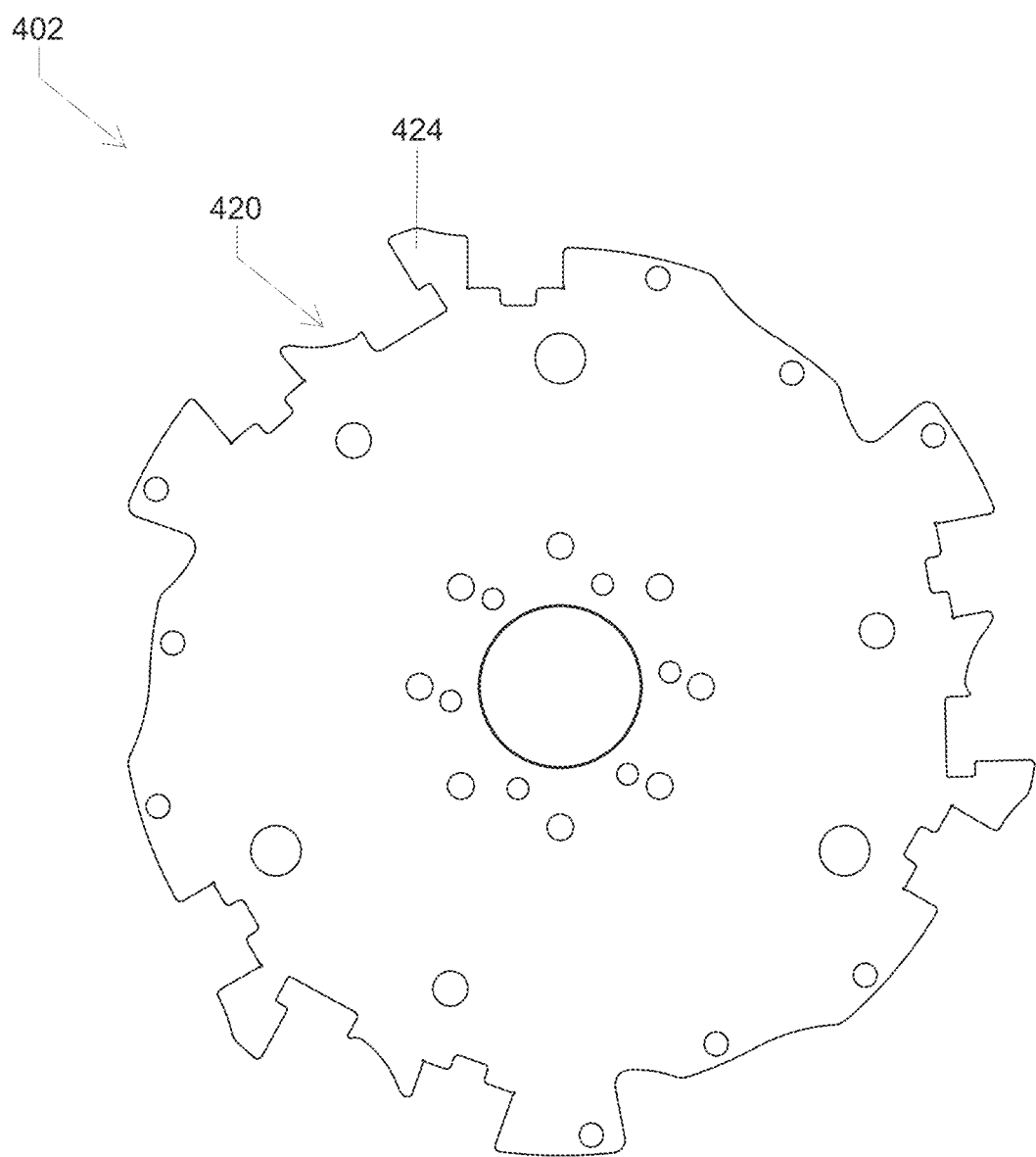
FIG. 19 is a side elevation view of a drive plate of the cutter wheel of FIGS. 17 and 18.
Figure 20:
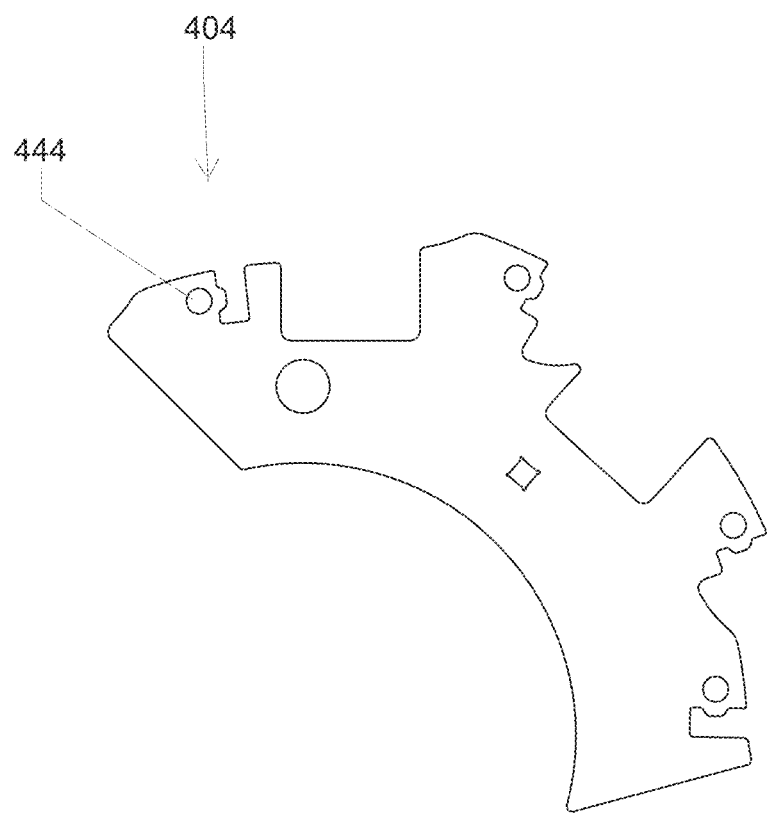
FIG. 20 is a side elevation view of a side wear plate of the cutter wheel of FIGS. 17 and 18.
Figure 28:
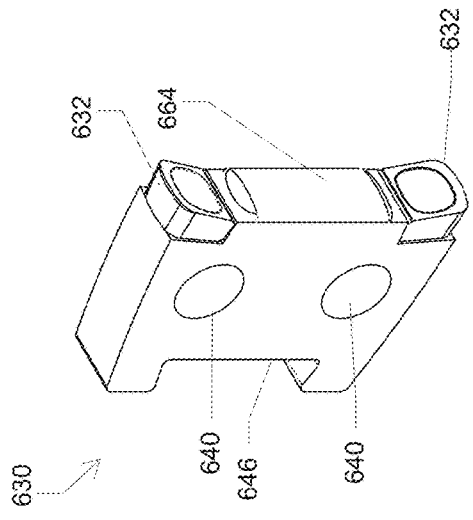
FIG. 28 is a front-left perspective view of the wear insert of FIG. 27.
Figure 27:
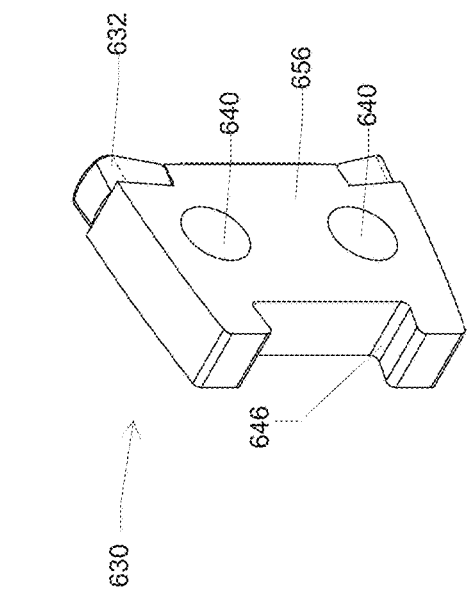
FIG. 27 is a left-rear perspective view of another alternate wear insert for the cutter wheel of FIGS. 17 and 18.
Figure 30:
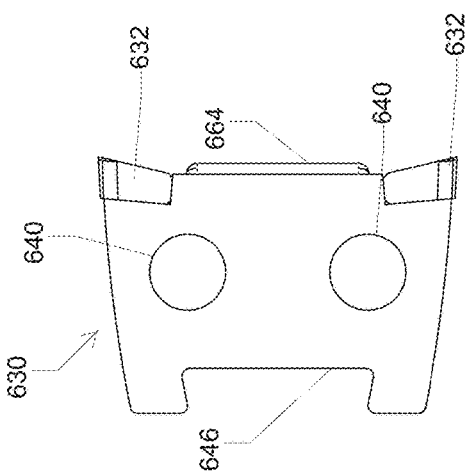
FIG. 30 is a left side elevation view of the wear insert of FIG. 27.
Figure 29:
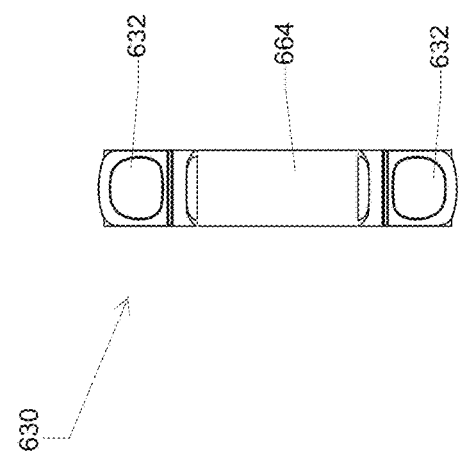
FIG. 29 is a front elevation view of the wear insert of FIG. 27.
Figure 31:
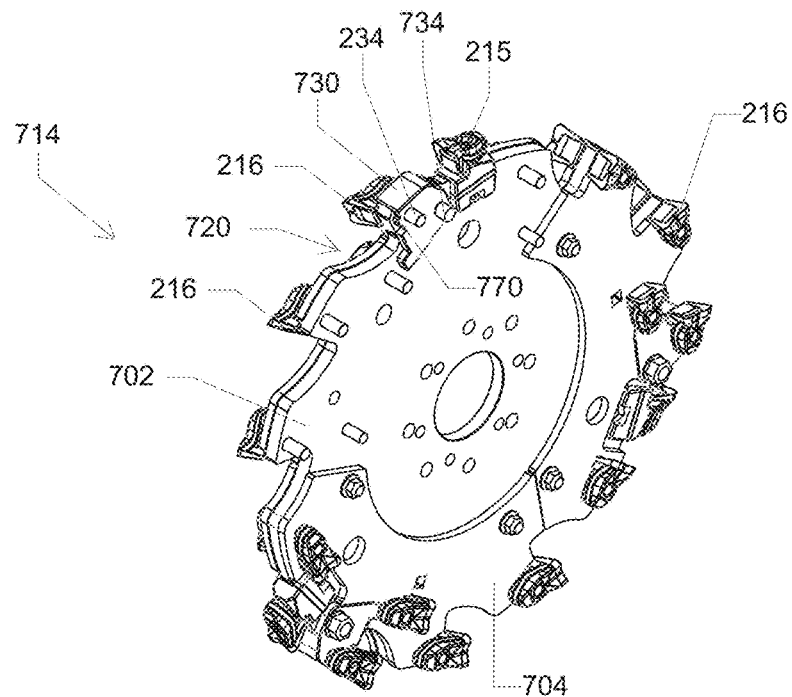
FIG. 31 is a perspective view of an alternate cutter wheel embodying aspects of the present invention. One side wear plate is removed to expose an alternate wear insert embodying aspects of the present invention.
Figure 32:
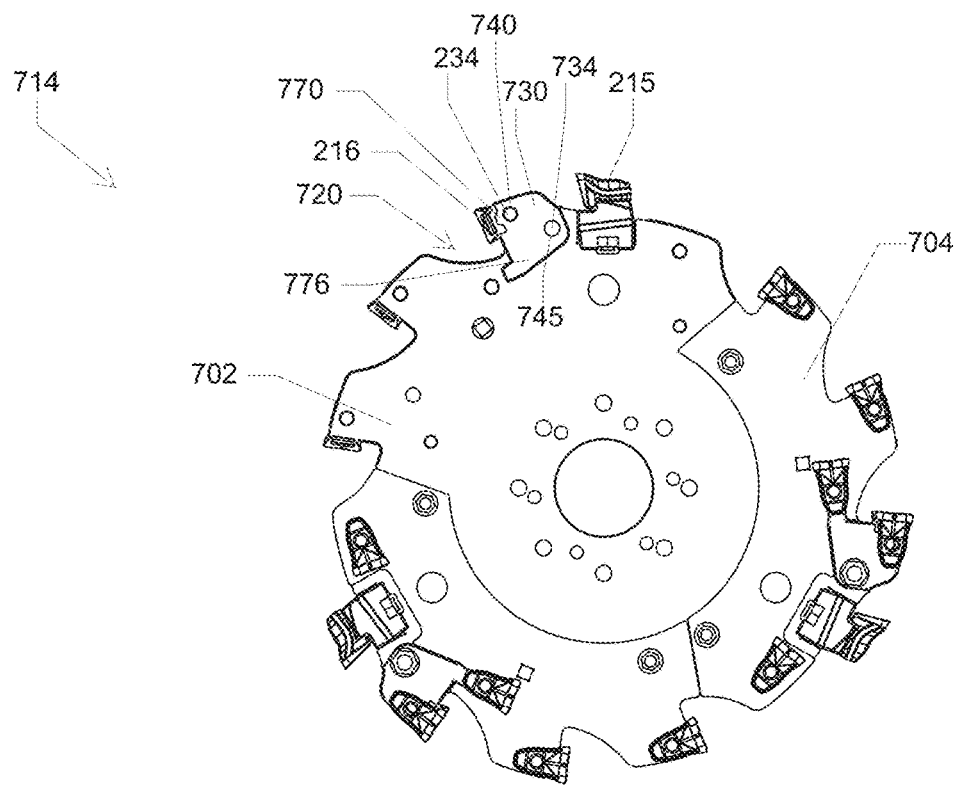
FIG. 32 is a side elevation view of the cutter wheel of FIG. 31, with the side wear plate removed to expose the wear insert.

FIGS. 17-23 illustrate a cutter wheel 414 according to another embodiment of the present disclosure, including many features in common with the cutter wheel 114 described above such that the description below is focused on those features and elements that are distinct. FIG. 17 shows the assembly without one of the wear plates 404 on the side of the center drive plate 402, and without one of the cutters 216 on the threaded fastener 234 so as to expose the wear insert 430 and the mount 424 at the trailing end of the gullet 420. As can be seen in FIGS. 17-19, the front-facing surface of the mount 424 is not straight or flat, but rather is hooked or hammer-shaped. The mount 424 forms a dovetail mating interface with a rear or trailing portion of the wear insert 430. As such, the wear insert 430 is formed with a dovetail slot 446 as shown in FIGS. 21-23. The wear insert 430 can be assembled onto the drive plate 402 by sliding the wear insert 430 sideways, parallel to the axis A, to engage the dovetail slot 446 with the mount 424. Once engaged in this way, the wear insert 430 is retained against radial removal or removal in a direction tangent to the forward rotation direction of the cutter wheel 414. Further fastening of the wear insert 430 can be provided by the threaded fastener 234. As in the previous embodiment, the threaded fastener 234 can extend through the two side cutters 216 and through corresponding apertures 444 in the adjacent wear plates 404 (see wear plate 404 in FIG. 20). Although a second pair of side cutters (e.g., like the cutters 217) can be provided in other constructions, the cutter wheel 414 has only a single pair of side cutters 216 along the radial line intersecting the wear insert 430. As shown in FIGS. 21-23, the wear insert 430 can be made reversible by way of two mounting apertures 440, either of which can be put into alignment with the threaded fastener 234 for use therewith. However, the exemplary wear insert 430 may be formed without a secondary fastener aperture for a secondary fastener (e.g., roll pin) since the dovetail interface provides a means for reliably maintaining position of the wear insert 430 to the cutter wheel 414 prior to securement of the threaded fastener 234. The wear insert 430 is shown having a body 456 and separate carbide wear resistant elements 432 like the wear insert 230 of the first embodiment. However, aspects of the wear insert 430 can also be provided in a monolithic wear insert like the wear insert 330 of FIGS. 14-16.

FIGS. 24-26 illustrate yet another exemplary wear insert 530. In this embodiment, the wear insert 530 includes a dovetail slot 546 like that of the wear insert 430. As such, the wear insert 530 can form a dovetail interface with the mount 424 of the drive plate 402 in the same manner as the wear insert 430. The wear insert 530 also features two available mounting apertures 540 for the threaded fastener 234 (and no additional fastener apertures). Rather than having a pair of forward-facing tips, the wear insert 530 includes a plurality of wear resistant elements 560 in the form of buttons (e.g., carbide buttons). Each of the buttons 560 can have an exposed surface formed as rounded or truncated sphere. The buttons 560 can have a flat side secured to the body 556 of the wear insert 530. The buttons 560 can be positioned on multiple sides of the body 556, including on a radially outer side thereof. Although shown with the dovetail-slotted body 556, carbide buttons may also be used on other types of wear insert bodies, such as but not limited to those of other embodiments disclosed herein.

FIGS. 27-30 illustrate yet another exemplary wear insert 630. In this embodiment, the wear insert 630 includes a dovetail slot 646 like that of the wear inserts 430, 530. As such, the wear insert 630 can form a dovetail interface with the mount 424 of the drive plate 402 in the same manner as the wear inserts 430, 530. The wear insert 630 also features two available mounting apertures 640 for the threaded fastener 234 (and no additional fastener apertures). In addition to having a pair of forward-facing wear resistant tips 632, the wear insert 630 includes an additional portion 664 including hardfacing. The hardfacing portion 664 is a front-facing portion between the wear resistant tips 632. Hardfacing refers to the addition of one or more harder materials deposited on a softer base material by various welding methods. In some constructions, hardfacing materials include cobalt-based alloys (e.g., as stellite), nickel-based alloys, chromium carbide alloys and NOREM. Although shown with the dovetail-slotted body 656 and wear resistant tips 632, hardfacing may also be used on other types of wear insert bodies, such as but not limited to those of other embodiments disclosed herein.

Figure 33:
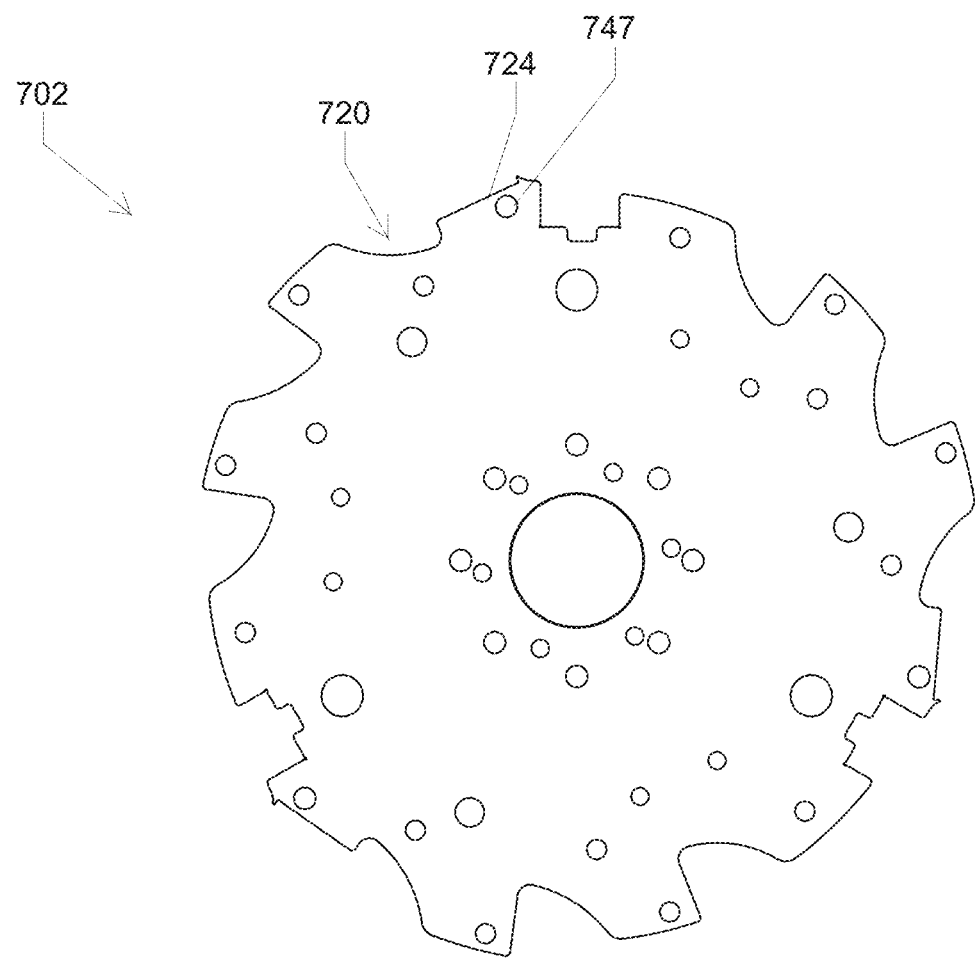
FIG. 33 is a side elevation view of a drive plate of the cutter wheel of FIGS. 31 and 32.
Figure 34:
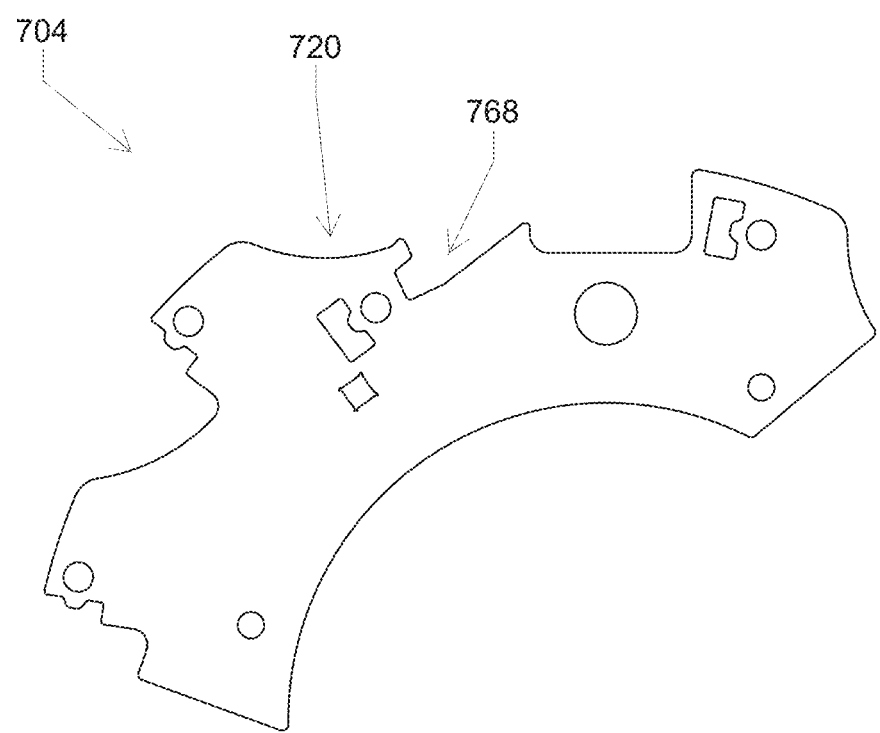
FIG. 34 is a side elevation view of a side wear plate of the cutter wheel of FIGS. 31 and 32.
Figure 35:
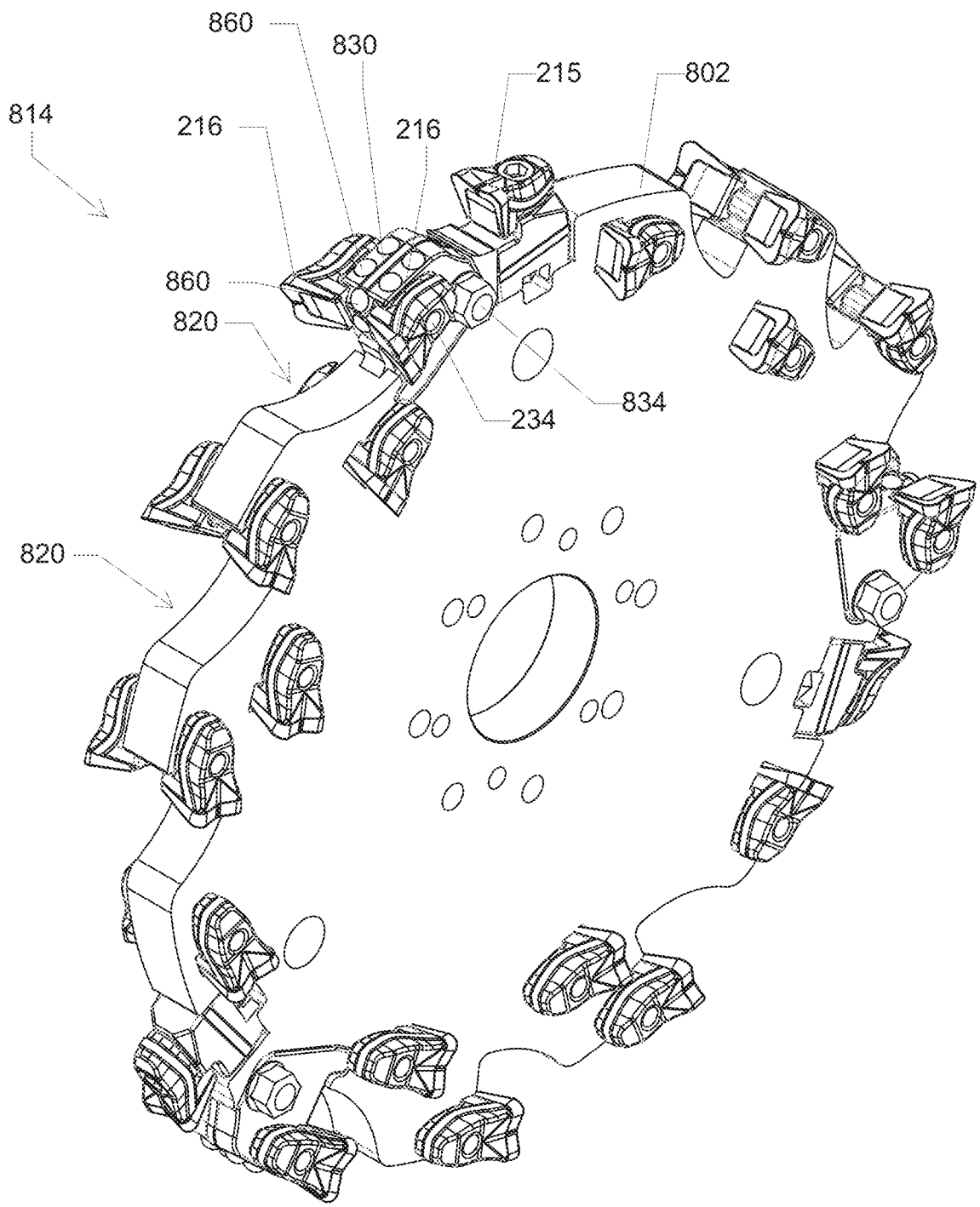
FIG. 35 is a perspective view of an alternate cutter wheel embodying aspects of the present invention. The cutter wheel does not utilize any side wear plates. Wear inserts embodying aspects of the present invention are mounted on the peripheral portion of the cutter wheel.
Figure 36:
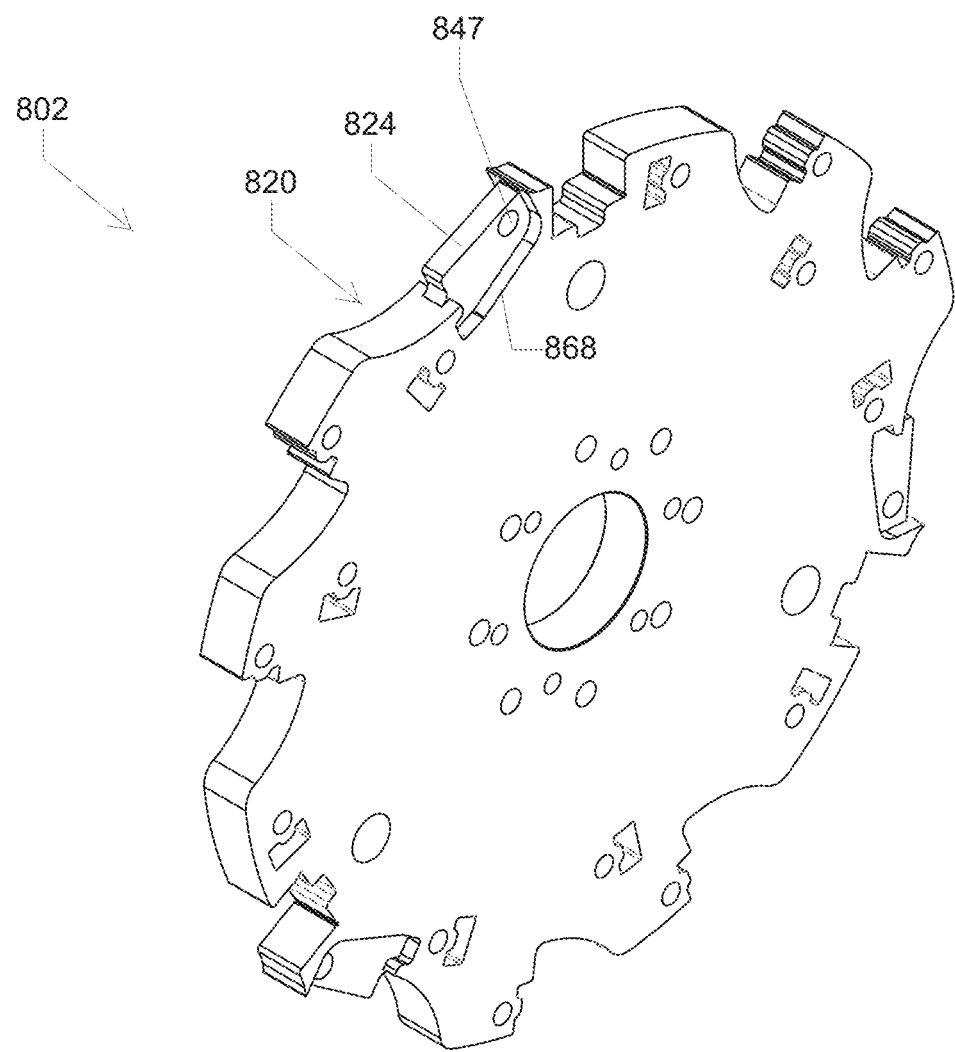
FIG. 36 is a perspective view of the drive plate of the cutter wheel of FIG. 35.
Figure 37:
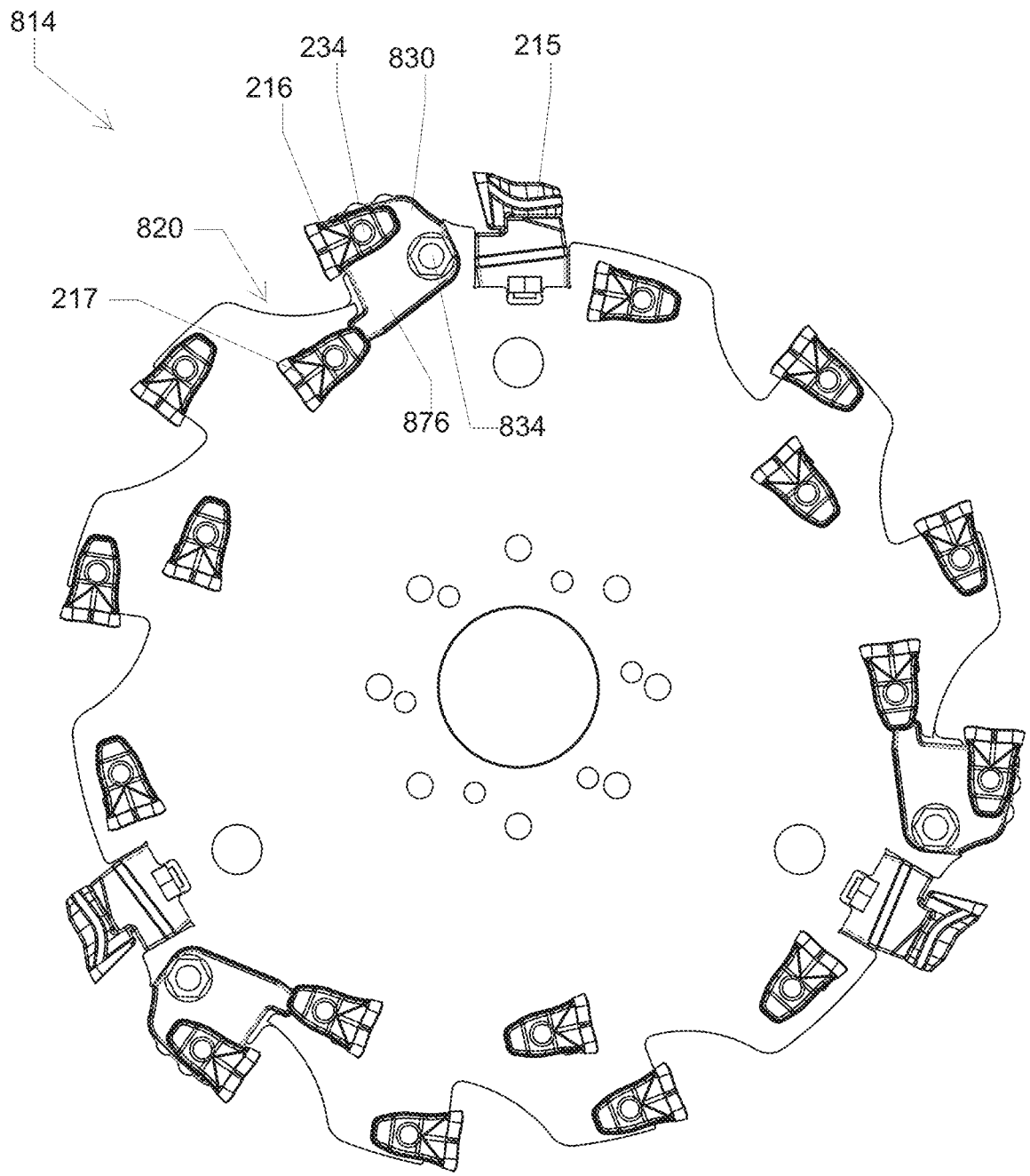
FIG. 37 is a side elevation view of the cutter wheel of FIG. 35.
Figure 38:
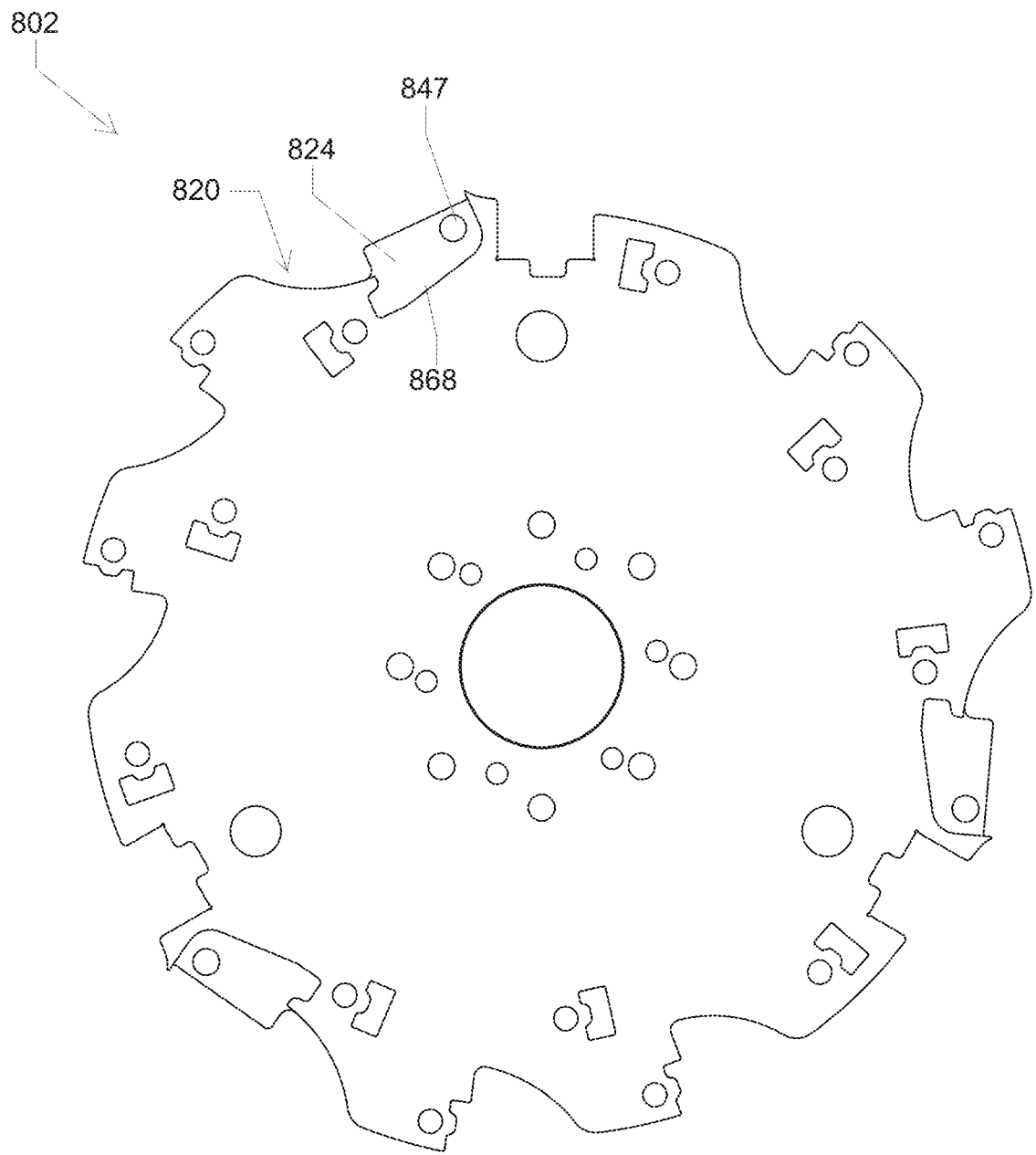
FIG. 38 is a side elevation view of the drive plate of FIG. 36.

FIGS. 31-34 illustrate yet another embodiment of a cutter wheel 714, including many features in common with the cutter wheels described above such that the description below is focused on those features and elements that are distinct. Rather than having wear inserts that are positioned in the gullet at the forward side of a mount, the cutter wheel 714 includes wear inserts 730 configured as caps that fit at least partially over the mount 724 on the drive plate 702. Contrary to other embodiments, the wear plates 704 do not cover the outside (lateral sides) of the wear inserts 730. The cap-type wear inserts 730 can be plain or hardened or wear resistant steel in some constructions. A fastener 734 is used to attach each wear insert 730 to the center drive plate 702. However, the fastener 734 does not secure the wear insert 730 by clamping with the fastener 734 between the wear plates 704 since the fastener 734 extends through apertures 745 in side flanking portions of the wear insert 730 and also through an aperture 747 provided directly in the center drive plate 702 as shown in FIG. 33 (e.g., in the mount 724). The side flanking portions of the wear inserts 730 lie outboard the respective side surfaces of the drive plate 702. The side flanking portions can include legs 776 that extend radially inward and toward the forward rotation direction. As shown, the legs 776 form the radially inner part of each side flanking portion and are each joined to a central cap portion that extends over the outer peripheral edge of the drive plate 702. Although not clamped by the wear plates 704, the wear insert 730 may optionally mate or interface with the wear plate(s) 704 to help secure and position the wear insert 730. See for example the pockets 768 in FIG. 34 formed at the outer peripheral edge of the wear plate 704, which can receive the corresponding leg portion of one of the wear inserts 730. Finally, the side flanking portions of the wear inserts 730 can also include cutter mounting surfaces including mounting bosses 770 for engaging the undersides of the respective side-mounted cutters 216. Aspects of this embodiment can also be used on a non-laminated cutter wheel 814 (i.e., single piece drive plate 802 used without additional wear plates on its sides) as shown in FIGS. 35-38.

As with the cutter wheel 714, the cutter wheel 814 of FIGS. 35-38 includes cap-style wear inserts 830 that fit at least partially over the mount 824 of the drive plate 802. However, the drive plate 802 in the embodiment of FIGS. 35-38 is a thicker, non-laminated plate such that the drive plate 802 may have a thickness substantially similar to a combined thickness of the drive plate 702 and wear plates 704. The mount 824 (FIG. 36) can be formed by a reduced-thickness peripheral portion of the one-piece drive plate 802. For example, the mounts 824 may be a machined into the profile of the drive plate 802 following other manufacturing step(s) that produce the drive plate 802 at a uniform thickness. Thus, the mounts 824 may be substantially similar in thickness to the drive plates of prior embodiments, and particularly the drive plate 702 such that the wear inserts 830 can be similarly-sized to the wear inserts 730. The wear inserts 730, 830 may each be compatible with both the thinner drive plate 702 of FIG. 33 and the thicker drive plate 802 of FIG. 36. However, it should be understood that the concepts disclosed herein do not necessitate any particular drive plate thickness, and the drive plates may have a number of different thicknesses in practice. The cap-type wear insert 830 is mounted similarly to the manner in which the wear insert 730 is mounted to the cutter wheel 714. In particular, the threaded fastener 234 extends through the wear insert 830 (via apertures 840) and through both side-mounted cutters 216, while an additional fastener 834 extends through the wear insert 830 (via apertures 845) and a corresponding aperture 847 in the drive plate 802. Similar to the pockets 768 in FIG. 34 formed at the outer peripheral edge of the wear plate 704 in the prior embodiment, the drive plate 802 alone can include pockets 868 to accommodate and interface with the leg portions of the wear inserts 830. The pockets 868 are formed at the locations where the thickness transitions from the main or nominal thickness of the drive plate 802 to the reduced thickness of the mount 824.

A single wear insert 830 is shown in each of FIGS. 39-43. The wear insert 830 has the cap-type configuration discussed above, including legs 876, like that of the wear insert 730. The configuration of the aperture 840, 845 through the wear insert body and the cutter mount bosses 770, 870 are also similar between the two wear inserts 730, 830. FIGS. 39-43 further illustrate a plurality of wear resistant buttons 860, which are not included in the wear insert 730. The buttons 860 can be similar to the buttons 560 of the wear insert 530 of FIGS. 24-26. The wear insert 830 may have an increased width compared to the wear insert 530, as its legs 876 wrap over the sides of a drive plate, and need not fit between adjacent wear plates within the thickness of the drive plate. In this case, the wear insert 830 is provided with multiple rows of buttons 860, at least in certain portions thereof. As illustrated, the buttons 860 facing forward are provided in a single row (directly between the two cutter mounting bosses 870), while the buttons 860 on the radially outer surface of the wear insert 830 are provided in two axially-spaced rows.

Figure 44:
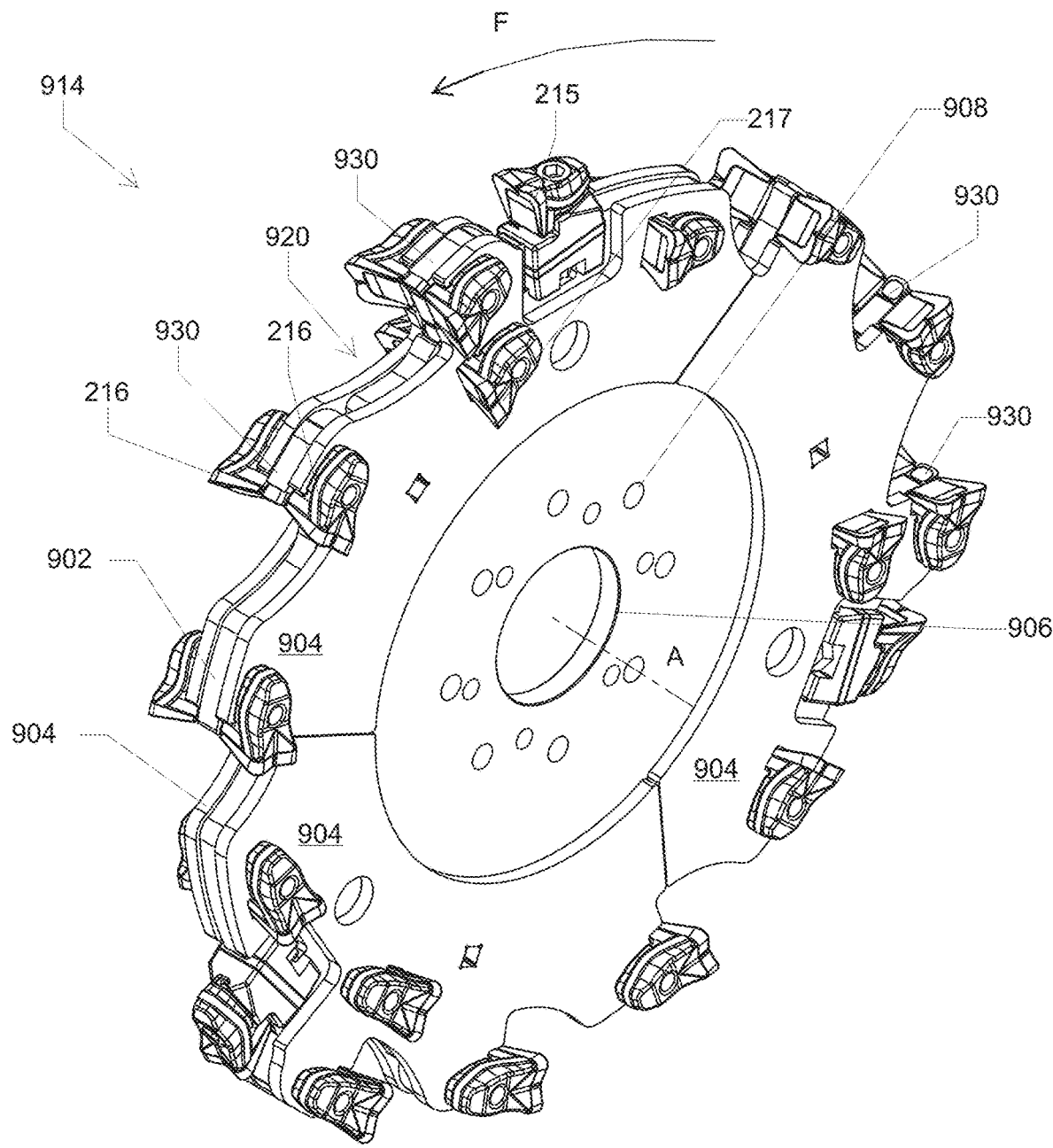
FIG. 44 is a perspective view of a cutter wheel according to another embodiment of the present disclosure.
Figure 45:
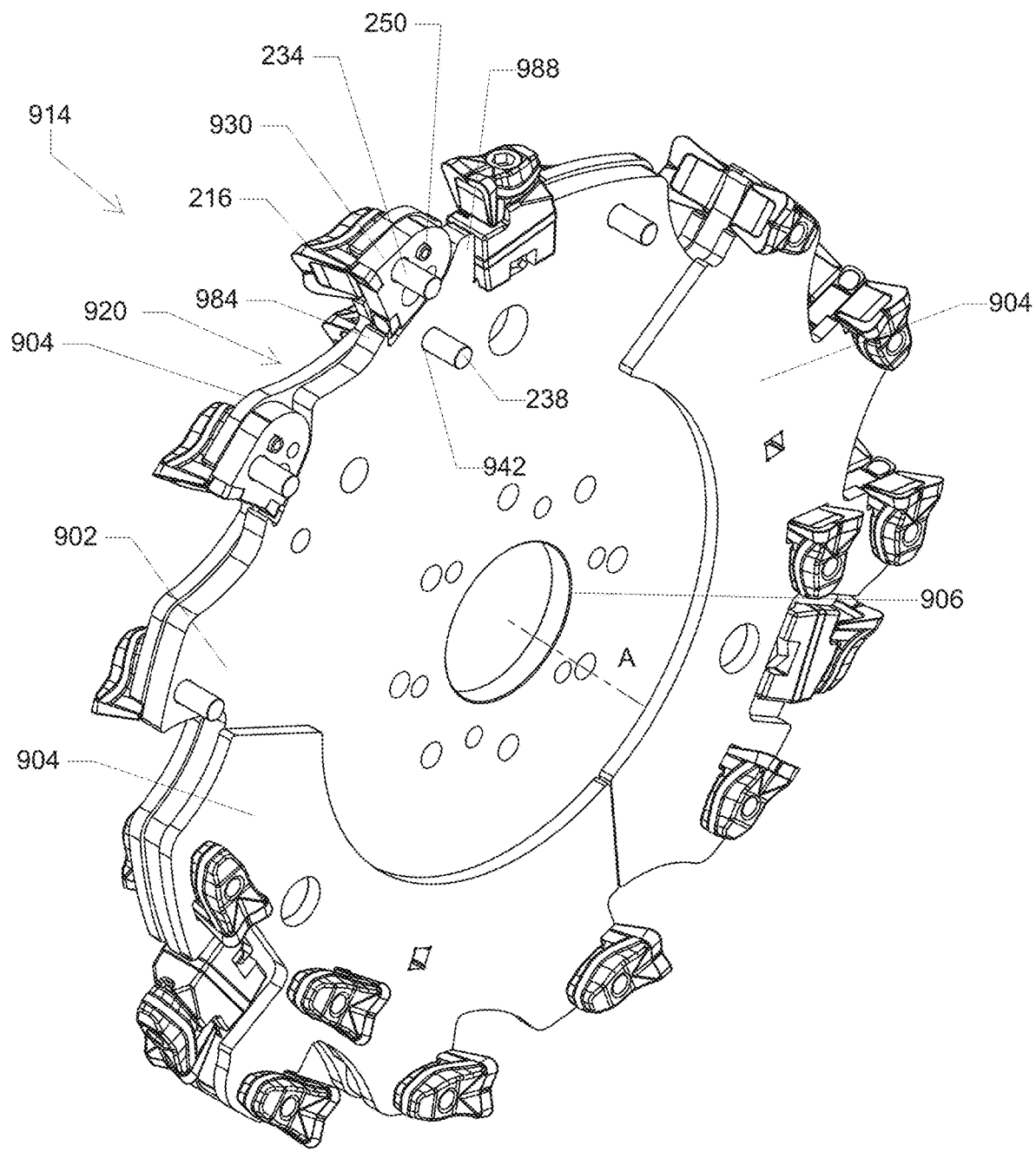
FIG. 45 is a perspective view of the cutter wheel of FIG. 44, with one side wear plate removed to expose a separate wear insert embodying aspects of the present invention.
Figure 46:
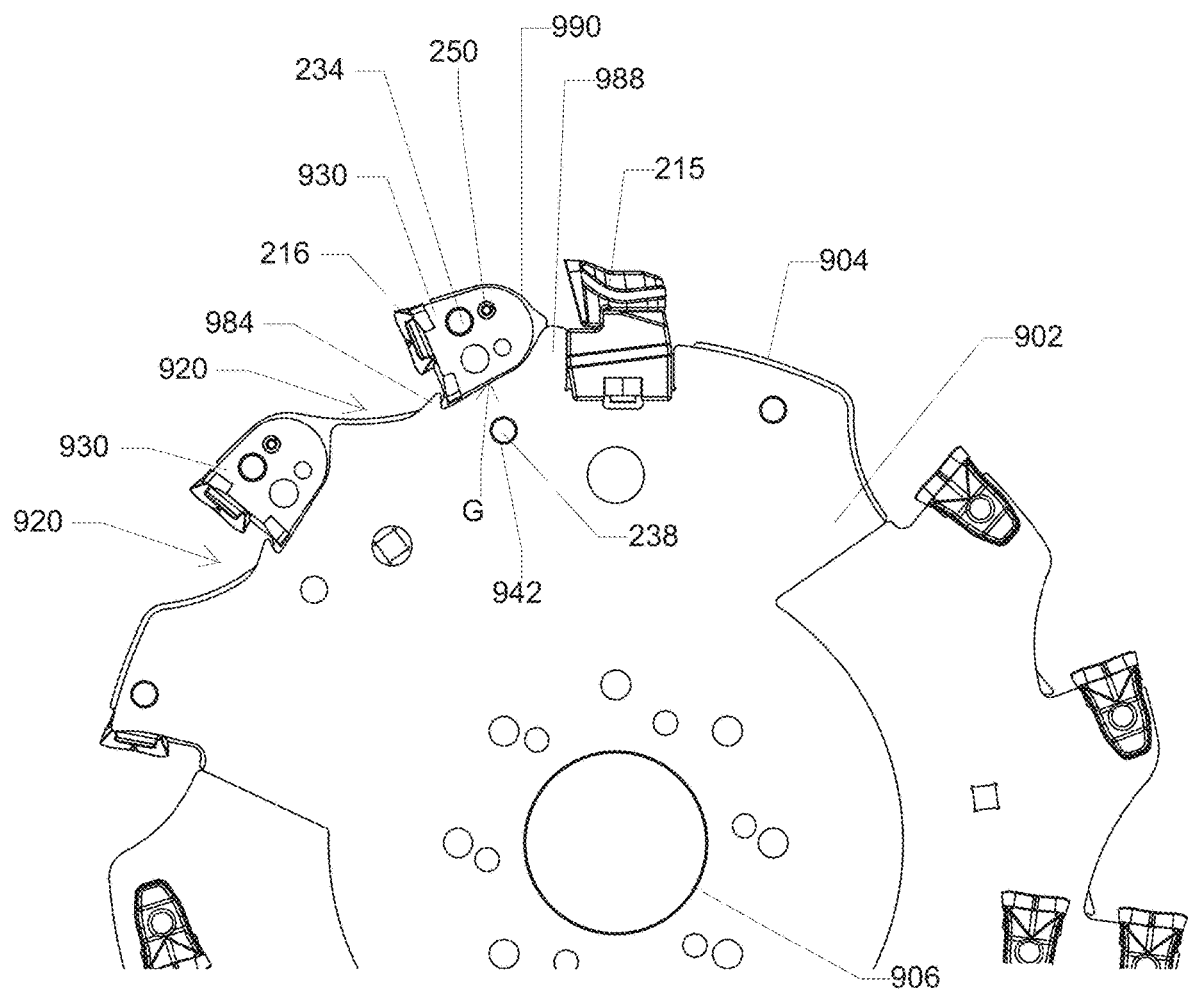
FIG. 46 is a side elevation view of the cutter wheel of FIG. 44, with the side wear plate removed as in FIG. 45.

FIGS. 44-55 illustrate a cutter wheel 914 according to another embodiment of the present disclosure, including many features in common with the cutter wheel 114 described above such that the description below is focused on those features and elements that are distinct. FIGS. 45 and 46 show the assembly without one of the wear plates 904 on the side of the center drive plate 902, and without the nearside cutters 216, 217 in this area so as to expose the wear insert 930 and its relation to the gullet 920 and the drive plate 902 in general. As can be seen in these and other views, the outer peripheral edge of the drive plate 902 does not include any mount for the cutters 216 or the wear insert 930 (e.g., no straight or hammer-shaped forward-facing surface). With no such mount, a clearance gap G is formed between the outer peripheral edge of the drive plate 902 and the adjacent portion of the wear insert 930 when mounted. The clearance gap G, whether uniform or variable, is maintained along an entire non-contact interface between the outer peripheral edge of the drive plate 902 and the wear insert 930. The wear insert 930 is indirectly mounted to the drive plate 902 exclusively by way of the wear plates 904 alongside the drive plate 902, the clearance gap G leaving the wear insert 930 in floating relationship with respect to the drive plate 902. As in the preceding description, the threaded fastener 234 can extend through the two side cutters 216 and through corresponding apertures 944 in the adjacent wear plates 904 (see wear plate 904 in FIG. 55), without passing through the drive plate 902. The fastener 234 creates a clamping force that is exerted on the drive plate 902 between the wear plates 904 and the cutters 216 beyond the wear plates 904. As shown in FIGS. 45-47, additional fasteners 238 may secure the wear plates 904 to the drive plate 902, passing directly through respective apertures 942, 946 in both the drive plate 902 and the wear plates 904. In the illustrated construction, the threaded fastener 238 mounts a pair of radially inner side-mounted cutters 217.

Figure 44A:
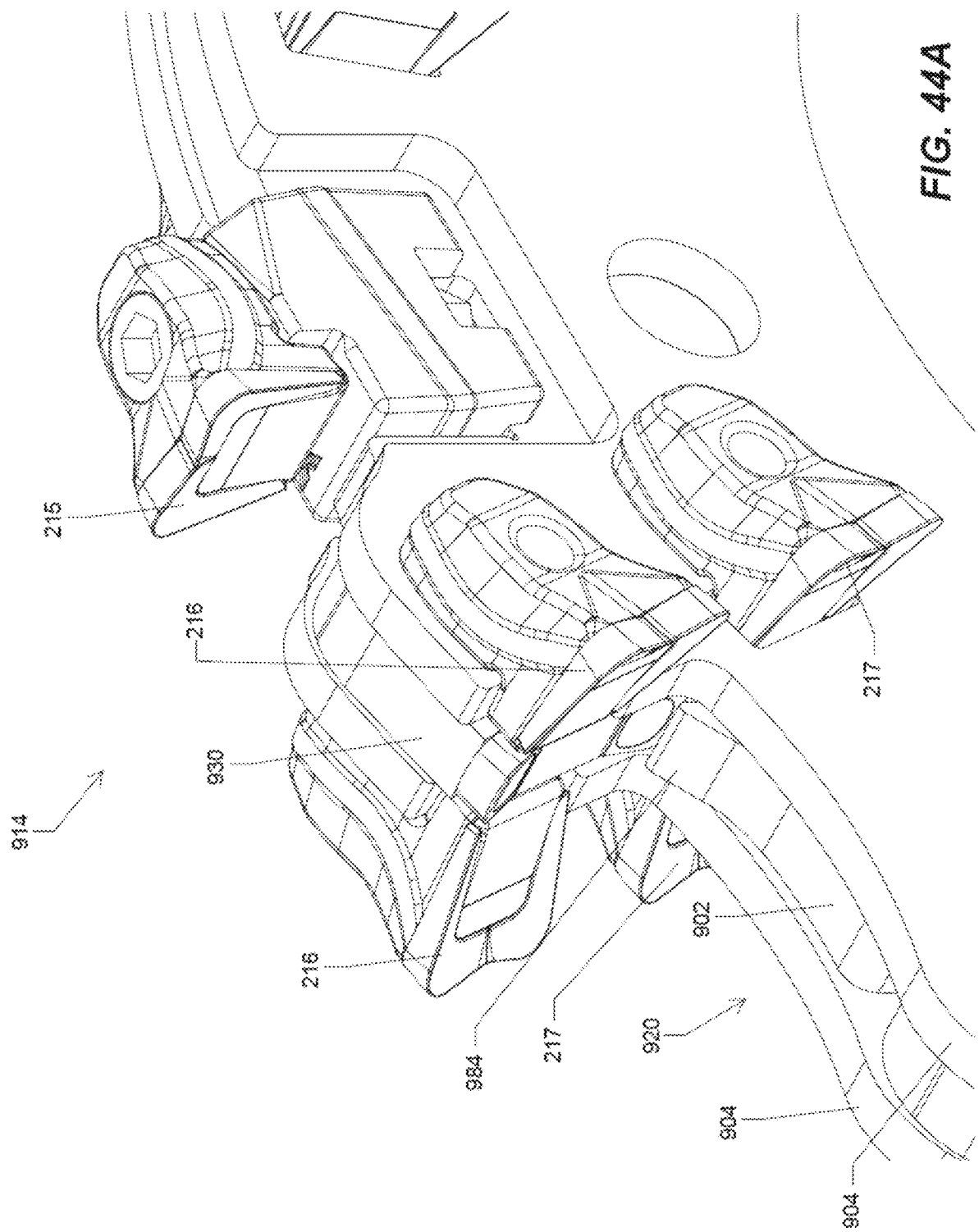
FIG. 44A is a detail view of a peripheral portion of the cutter wheel of FIG. 44.

As can be seen from FIGS. 44-46, among others, the wear inserts 930 can be positioned at the trailing end of the respective gullets 920. The gullets 920 are formed by the concave shaping of the outer peripheral edges of the drive plate 902 and the wear plates 904. Counter to the forward rotation direction F, the shape of the gullet 920 can include a portion of increasing depth followed by a portion of decreasing depth. The depths are taken from an imaginary reference circle or arc centered at the axis A. The trailing portion of the gullet 920 having the decreasing depth can result in a ramp or claw formation 984 having the shape of a sloped, radially-outward projection. As illustrated, this formation 984 is provided in the center drive plate 902 and not in the wear plates 904. As such, at least a portion of the formation 984 projects radially outward beyond the wear plates 904 as seen in FIGS. 44A and 47. The depth of the gullet 920 taken along the wear plates 904 in the leading-to-trailing direction can be strictly increasing or constant, without any decreasing depth portion. A radially inner portion of the wear insert 930 can be situated behind and covered by the formation 984 when viewed in FIG. 47A from the front (toward the trailing direction according to the forward rotation direction F).

Figure 48:
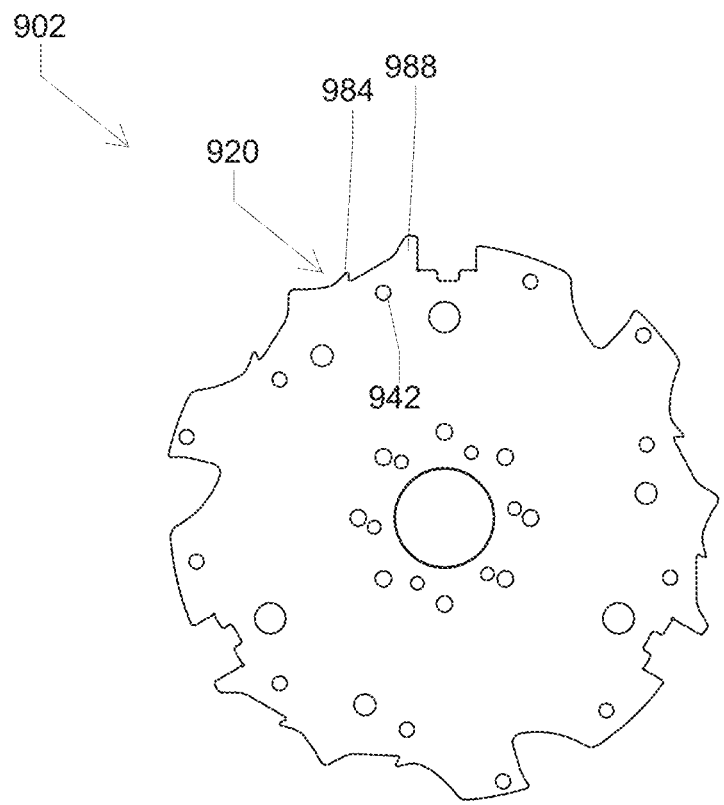
FIG. 48 is a side elevation view of a drive plate of the cutter wheel of FIG. 44.
Figure 49:
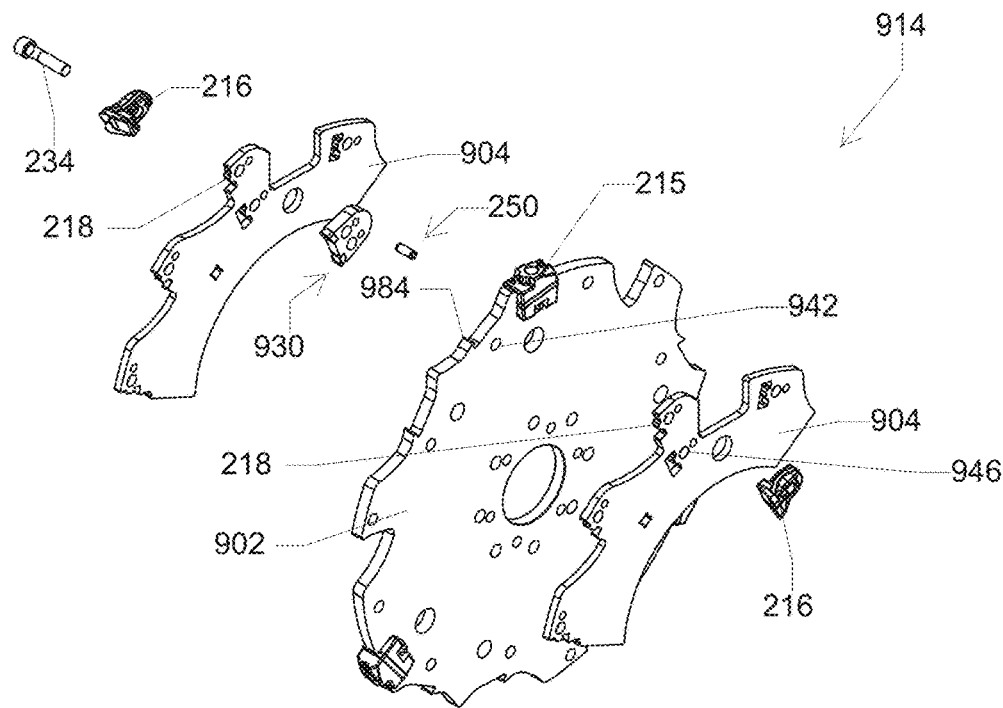
FIG. 49 is an exploded perspective view of the cutter wheel of FIG. 44, including selected cutters, wear plates, and the wear insert.
Figure 50:
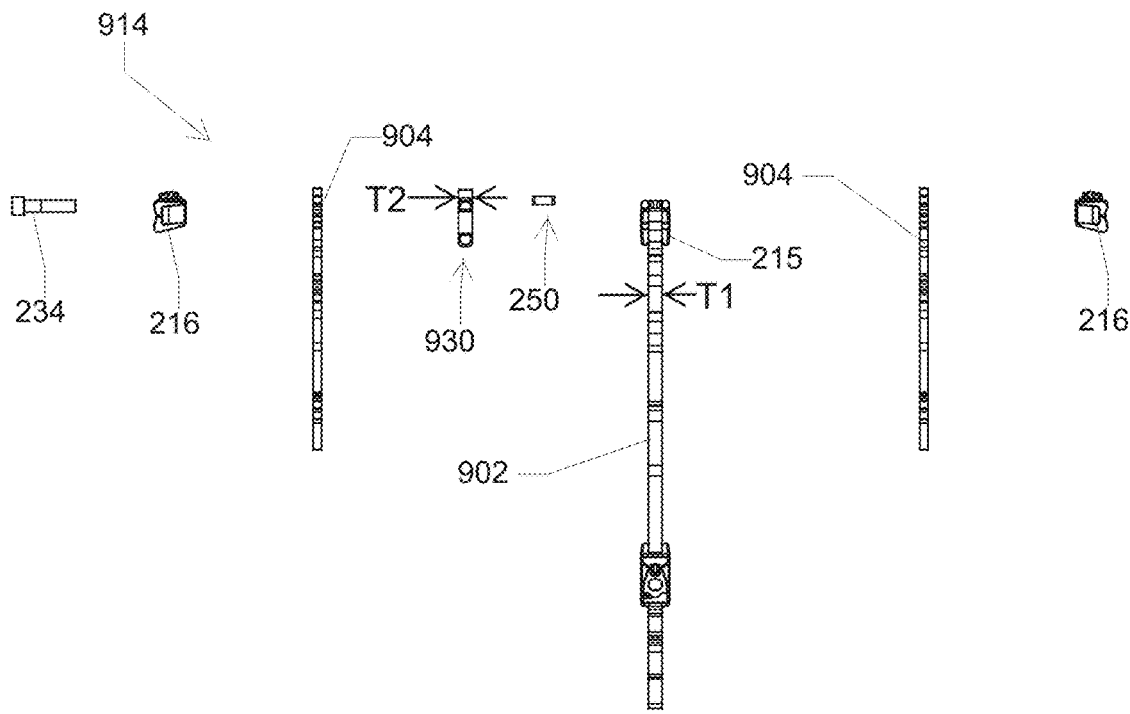
FIG. 50 is an exploded front elevation view of the cutter wheel of FIG. 44, including selected cutters, wear plates, and the wear insert shown in FIG. 49.
Figure 51:
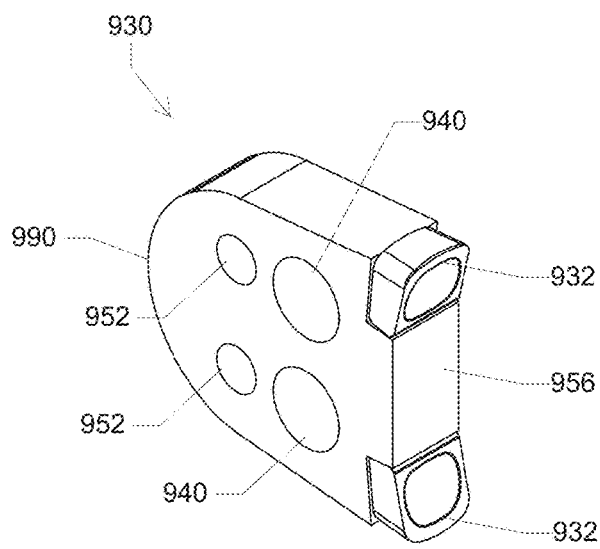
FIG. 51 is a front-right perspective view of the wear insert of FIGS. 45, 47A, 49 and 50.
Figure 52:
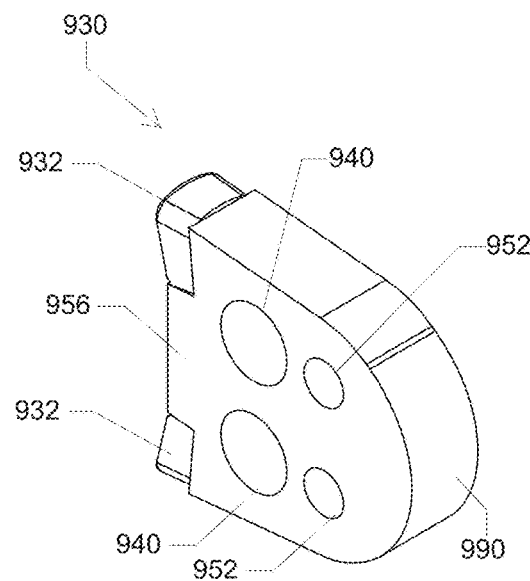
FIG. 52 is a rear-right perspective view of the wear insert of FIG. 51.
Figure 53:
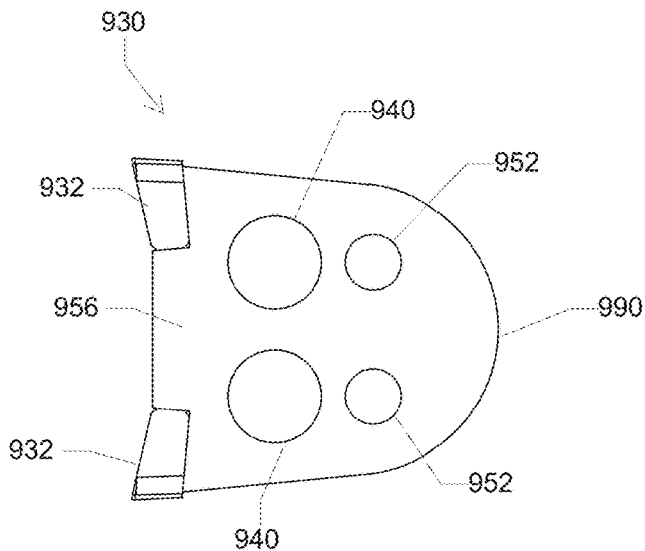
FIG. 53 is a right side elevation view of the wear insert of FIG. 51.
Figure 54:
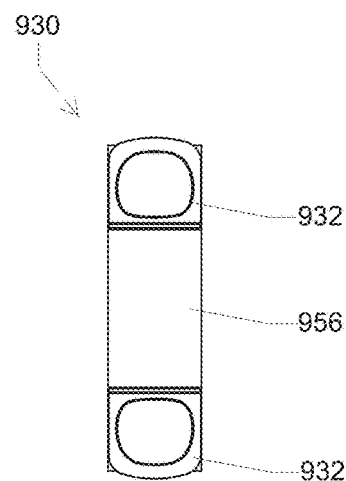
FIG. 54 is a front elevation view of the wear insert of FIG. 51.
Figure 55:
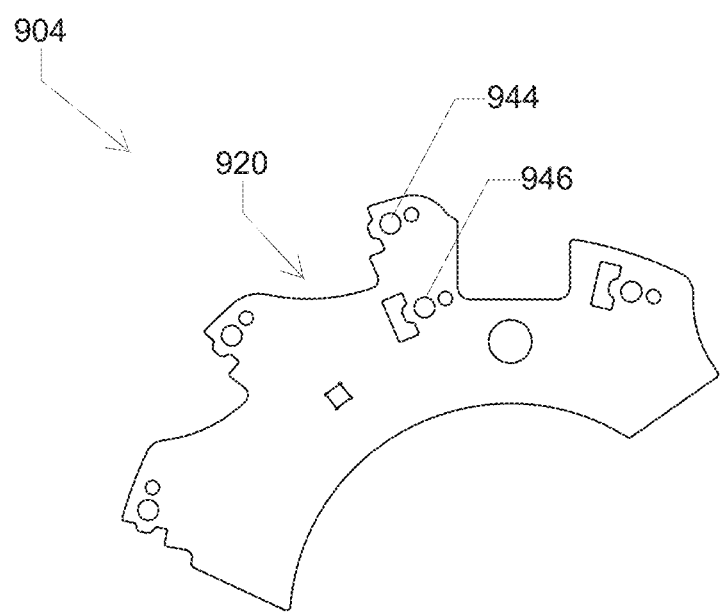
FIG. 55 is a side elevation view of a side wear plate of the cutter wheel of FIG. 44.

As shown in FIGS. 45, 46, and 48, the center drive plate 902 additionally includes another radial projection 988 situated directly behind (i.e., trailing) the wear insert 930. The radial projection 988 helps fill the gap that would otherwise be present between the wear plates 904 and behind the wear insert 930. The radial projection 988 helps to stabilize the wear plates 904 by preventing bending of the wear plates 904 toward each other. The radial projection 988 can extend further from the central axis A than the formation 984 that is situated in front of the wear insert 930. As shown in at least FIGS. 46 and 51-53, the wear insert 930 can have a trailing end surface 990 that is rounded or otherwise truncated to accommodate and at least partially follow the contour of the radial projection 988. As shown, the trailing end surface 990 can be semi-circular in side view. This shape, while not required in all constructions, can help facilitate the symmetrical, reversible nature of the wear insert 930. As best appreciated from FIG. 46, the wear plate 904 (which is shown behind the two wear inserts 930 near the top of the view) can have a shape complementary to the wear insert 930 along the radially outer and trailing sides of the wear insert 930. The complementary portion of the wear plate 904 can be slightly oversized (e.g., 0.5 mm to 5 mm) so that the wear insert 930 is effectively nested between the two flanking wear plates 904. In the axial direction, the wear insert 930 does not extend outside an axial thickness T1 of the drive plate 902. For example, the axial thickness T2 of the wear insert 930 is equal to or less than the thickness T1 measured between the two axial sides of the drive plate 902 as shown in FIG. 50.

Similar to the insert shown in FIGS. 21-23, the wear insert 930 can be made reversible by way of two mounting apertures 940, either of which can be put into alignment with the threaded fastener 234 for use therewith. The wear insert 930 can further include one or more secondary fastener apertures 952 for a secondary fastener (e.g., roll pin 250). The apertures 940, 952 are formed in a body 956 of the wear insert 930. The wear insert 930 is shown having carbide wear resistant elements 932 separate from the body 956 like the wear insert 230 of the first embodiment. However, aspects of the wear insert 930 can also be provided in a monolithic wear insert like the wear insert 330 of FIGS. 14-16. Carbide or similar wear resistant buttons and/or hardfacing are also optional for the wear inserts 930, reference being made to the preceding portions of the disclosure.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A rotatable cutter wheel of a material reduction machine, the cutter wheel comprising:
a drive plate configured to be mounted on the material reduction machine for rotation in a forward rotation direction about a central axis, wherein the drive plate includes a central driveshaft aperture and an outer peripheral edge;
a wear plate positioned along a first axial side of the drive plate and removably coupled to the drive plate;

a cutter removably coupled for rotation with the drive plate via a fastener; and a wear insert positioned to cover a portion of the outer peripheral edge of the drive plate, wherein the wear insert is mounted to the wear plate and held in spaced relation to the outer peripheral edge of the drive plate, and wherein the fastener that removably couples the cutter to the drive plate also extends through an aperture in the wear insert.

2. The rotatable cutter wheel of claim 1, wherein the outer peripheral edge includes a gullet, and the wear insert is positioned at a trailing portion of the gullet adjacent the cutter.

3. The rotatable cutter wheel of claim 1, further comprising an additional fastener securing the wear insert to the wear plate.

4. The rotatable cutter wheel of claim 1, wherein the cutter is one of a pair of side-mounted cutters flanking the wear insert.

5. The rotatable cutter wheel of claim 4, wherein the fastener extends through both of the pair of side-mounted cutters and the wear insert.

6. The rotatable cutter wheel of claim 1, further comprising an additional wear plate positioned along a second axial side of the drive plate and removably coupled to the drive plate, wherein the wear insert is mounted to the wear plate and the additional wear plate.

7. The rotatable cutter wheel of claim 1, wherein the wear insert does not extend outside an axial thickness of the drive plate.

8. The rotatable cutter wheel of claim 1, wherein the cutter and the fastener are in spaced relation to the drive plate when assembled.

9. The rotatable cutter wheel of claim 1, wherein the wear insert has carbide buttons.

10. The rotatable cutter wheel of claim 1, wherein the wear insert includes hardfacing.

11. The rotatable cutter wheel of claim 1, wherein the wear insert includes a body and at least one hardened or wear resistant element secured to the body.

12. The rotatable cutter wheel of claim 1, wherein the wear insert is reversible between a first mounted orientation with respect to the drive plate and a second mounted orientation in which a radially outer side is reversed with a radially inner side.

13. The rotatable cutter wheel of claim 1, wherein the wear insert is situated between a first radial projection formed in the outer peripheral edge of the drive plate at a leading side of the wear insert and a second radial projection formed in in the outer peripheral edge of the drive plate at a trailing side of the wear insert.

14. A rotatable cutter wheel of a material reduction machine, the cutter wheel comprising:

a drive plate configured to be mounted on the material reduction machine for rotation in a forward rotation direction about a central axis, wherein the drive plate includes a central driveshaft aperture and an outer peripheral edge;

first and second wear plates positioned respectively along first and second axial sides of the drive plate and removably coupled to the drive plate;

a cutter removably coupled for rotation with the drive plate via a fastener; and a wear insert positioned to cover a portion of the outer peripheral edge of the drive plate, wherein the wear insert is mounted between the first and second wear plates, and wherein the fastener that removably couples the cutter to the drive plate also extends through an aperture in the wear insert.

15. The rotatable cutter wheel of claim 14, wherein the outer peripheral edge includes a gullet, and the wear insert is positioned at a trailing portion of the gullet adjacent the cutter.

16. The rotatable cutter wheel of claim 14, further comprising an additional fastener securing the wear insert to the first and second wear plates.

17. A rotatable cutter wheel of a material reduction machine, the cutter wheel comprising:

a drive plate configured to be mounted on the material reduction machine for rotation in a forward rotation direction about a central axis, wherein the drive plate includes a central driveshaft aperture and an outer peripheral edge;

first and second wear plates positioned respectively along first and second axial sides of the drive plate and removably coupled to the drive plate;

a pair of side-mounted cutters removably and indirectly coupled for rotation with the drive plate via the first and second wear plates; and a wear insert positioned to cover a portion of the outer peripheral edge of the drive plate, wherein the wear insert is mounted between the pair of side-mounted cutters.

18. The rotatable cutter wheel of claim 17, further comprising a fastener extending through both of the pair of side-mounted cutters and the wear insert without extending through the drive plate.

* * * * *